US008015176B2

(12) United States Patent
Colby et al.

(10) Patent No.: US 8,015,176 B2
(45) Date of Patent: Sep. 6, 2011

(54) METHOD AND SYSTEM FOR CLEANSING SEQUENCE-BASED DATA AT QUERY TIME

(75) Inventors: Latha Sankar Colby, Sunnyvale, CA (US); Sangeeta T. Doraiswamy, San Jose, CA (US); Jun Rao, San Jose, CA (US); Hetal Thakkar, Wilmington, CA (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 12/124,327

(22) Filed: May 21, 2008

(65) Prior Publication Data

US 2008/0222123 A1 Sep. 11, 2008

Related U.S. Application Data

(63) Continuation of application No. 11/559,452, filed on Nov. 14, 2006, now Pat. No. 7,516,128.

(51) Int. Cl.
*G06F 17/30* (2006.01)

(52) U.S. Cl. ......... 707/713; 707/690; 707/719; 707/769

(58) Field of Classification Search ................... 707/1, 3, 707/4, 6, 104.1, 687, 692, 713, 765, 759, 707/769, 779, 690, 719
See application file for complete search history.

(56) References Cited

U.S. PATENT DOCUMENTS

| 6,526,416 | B1 | 2/2003 | Long |
| 6,965,888 | B1 | 11/2005 | Cesare et al. |
| 7,318,162 | B2 | 1/2008 | Rineer et al. |
| 7,363,289 | B2 * | 4/2008 | Chaudhuri et al. ..... 707/999.002 |
| 7,363,299 | B2 * | 4/2008 | Dalvi et al. ............ 707/999.003 |
| 7,443,282 | B2 | 10/2008 | Tu et al. |
| 7,702,610 | B2 * | 4/2010 | Zane et al. ............. 707/999.001 |
| 7,747,606 | B2 * | 6/2010 | Dageville et al. ............. 707/713 |
| 2004/0083199 | A1 | 4/2004 | Govindugari et al. |
| 2004/0143600 | A1 | 7/2004 | Musgrove et al. |
| 2005/0262121 | A1 | 11/2005 | Cesare et al. |
| 2006/0143439 | A1 | 6/2006 | Arumugam et al. |

(Continued)

FOREIGN PATENT DOCUMENTS

WO WO 95/30201 11/1995

OTHER PUBLICATIONS

A Deferred Cleansing Method for RFID Data Analytics; SIGMOD '06, Jun. 2006, Chicago, IL, USA; Copyright 2006 ACM 1-58113-000-0/00/0004; 12 pages.

(Continued)

*Primary Examiner* — Tim T. Vo
*Assistant Examiner* — Dangelino N Gortayo
(74) *Attorney, Agent, or Firm* — Schmeiser, Olsen & Watts

(57) ABSTRACT

A method and system for cleansing anomalies from sequence-based data at query time. Sequence-based data such as RFID data is loaded into a database. One or more cleansing rules are received at a cleansing rules engine. The cleansing rule engine converts the cleansing rule(s) to a template that includes logic to compensate for anomalies in the sequence-based data. A query to retrieve the sequence-based data is received by a query rewrite engine. The query rewrite engine rewrites the query by applying the template logic. The rewritten query is executed at query time. The result of the rewritten query execution is identical to the result of executing the original query on a data set generated by applying the cleansing rule to all of the sequence-based data.

18 Claims, 16 Drawing Sheets

U.S. PATENT DOCUMENTS

| | | |
|---|---|---|
| 2007/0016616 A1 | 1/2007 | Brill et al. |
| 2007/0174185 A1* | 7/2007 | McGoveran .................. 705/39 |
| 2007/0294221 A1 | 12/2007 | Chen et al. |
| 2008/0222094 A1* | 9/2008 | Cox .................................. 707/3 |

OTHER PUBLICATIONS

Fan, Hao; Using AutoMed for Data Warehousing; School of Computer Science and Information Systems, Birkbeck College, University of London, Malet Street, London WC1E 7HX, hao@dsc.bbk.ac.us; Apr. 7, 2003; 23 pages.

Müller et al.; Problems, Methods, and Challenges in Comprehensive Data Cleansing; Humboldt-Universität zu Berlin zu Berlin, 10099 Berlin, Germany; {hmueller, freytag}@dbis.informatik.hu-berlin.de; 23 pages.

Notice of Allowance (Mail Date Nov. 24, 2008) for U.S. Appl. No. 11/559,452, filed Nov. 14, 2006; Confirmation No. 4135.

* cited by examiner

300

| C1: Pattern | Condition | Action |
|---|---|---|
| (A,*B) | B.reader = 'readerX' && B.rtime − A.rtime < 5 min | DELETE A |
| R1 (rid, epc, rtime, reader) = {(r1, e1, t1-2min, 'readerY'), (r2, e1, t1+2min, 'readerX')} | | Q1: select * from R1 where rtime < t1 |

| C2: Pattern | Condition | Action |
|---|---|---|
| (E, F) | E.biz_loc = F.biz_loc | DELETE F |
| R2 (rid, epc, rtime, biz_loc) = {(r3, e2, t2-2 min, 'locZ'), (r4, e2, t2+2 min, 'locZ') } | Q2: select * from R2 where rtime > t2 | |

| C1 | cr1: A.rtime<B.rtime,   A.epc=B.epc,<br>        B.rtime<A.rtime+5min, B.reader='readerX' |
|----|---|
| Q1 | s1 : A.rtime < t1<br>cc1: B.rtime <t1+5min && B.reader='readerX'<br>ec1: rtime<t1+5min &&<br>      (rtime<t1 ‖ reader='readerX') |

| C2 | cr2: E.rtime<F.rtime,     E.epc=F.epc, |
|----|----|
| Q2 | s2 : F.rtime > t2<br>cc2: {} |

```
Inputs: • s, a condition on R in a user query Q
        C, a cleansing rule on R
Output: Q_c, an expanded rewrite for answering Q[C]
Method: cr: correlation condition, cc: context condition
        ec: expanded condition
1.  cc = {}
2.  for each context reference X in C {
3.     cr = conjuncts in C's conditions referring to X +
            implied conjuncts on ckey and skey
4.     if X is position-based context
5.        keep only position-preserving conjuncts in cr
6.     run transitivity between cr and s (bind s to
            target reference T)
7.     d = derived conjuncts referring to X only
8.     if (d not empty) cc = cc || d
9.     else { cc = {}; break}
10. }
11. if (cc not empty) {
12.    ec = s||cc; s' = s − cc; Q_c = σ_s'(Φ_c(σ_cc(R))) }
13. else Q_c = null (no possible Q_c)
```

Input: SQL query Q of the form $\sigma_s R \leftrightarrow_{K1} \sigma_{S1} D_1 \leftrightarrow \ldots \leftrightarrow_{Kn} \sigma_{Sn} D_n$, where table R joins each table $D_i$ on column Ki and all joins are n:1.

Output: rewritten query $Q_j$.

1. order $D'_i$ in ascending selectivity order of $S'_i$.

2. for i=0 to m 3. if i=0, then generate a first SQL statement that defers all joins after cleansing.

4. else generate an SQL statement that pushes one more table $D'_i$ in selectivity order before cleansing.

5. convert each join condition to a local conjunct on R of the form $R.K_i$ in (select $K_i$ from $D_i$ where $S_i$).

6. apply algorithm of Fig. 4A.

7. if all "in" conjuncts are derived on the context reference, then generate a new SQL statement using algorithm in Fig. 4A and convert the "in" predicates back to joins.

8. compile up to m+1 SQL statements using a database optimizer and select the one with the cheapest cost estimate to determine $Q_j$.

Input: SQL query Q of the form $\sigma_s R \leftrightarrow_{JC_1} \sigma_{S_1} D_1 \leftrightarrow \ldots \leftrightarrow_{JC_n} \sigma_{S_n} D_n$, a set of subscribed rules Output: rewritten query $Q_j$ with respect to rule r.

1. order $D_1$ to $D_n$ in ascending selectivity order of $S_i$ 2. for i = 0 to n 3.  if i=0 then $T=\Pi_{ckey}(\sigma_s R)$ 4.  else $T=\Pi_{ckey}(\sigma_s R \leftrightarrow_{JC_1} \sigma_{S_1} D_1 \leftrightarrow \ldots \leftrightarrow_{JC_i} \sigma_{S_i} D_i)$ 5.  generate $Q[i]= \sigma_{s'}(\Phi_c(\sigma_{ec}(R) \leftrightarrow_{ckey}(T)))$, where s' and ec are computed as in Fig. 4A 6. compile all n+1 queries Q[i] (i from 0 to n) using a database optimizer and pick the one with the cheapest estimated cost as $Q_j$

Input: SQL query Q of the form $\sigma_s R$, a set of subscribed rules $C_1$ to $C_n$
Output: rewritten query $Q_o$ with respect to the rules
1. For each rule $C_i$
2.    compute a context condition $cc_i$ using lines 1 to 10 in Fig. 4A
3.    if $cc_i$ is empty, then return empty ($Q_o$ does not exist)
4. $Q_o = \sigma_s(\Phi_{Cn}...\Phi_{C1}(\sigma_{cc}(R)))$.

```
q1. "Dwell" analysis
with v1 as
( select biz_loc as current_loc, rtime,
      max(rtime) over (... rows 1 preceding) as prev_time,
      max(biz_loc) over (... rows 1 preceding) as prev_loc
   from caseR where rtime <= T1 )
select l1.loc_desc, l2.loc_desc, avg(rtime-prev_time)
from v1, locs l1, locs l2
where v1.prev_loc = l1.gln and v1.current_loc = l2.gln
group by l1.loc_desc, l2.loc_desc q2. Site analysis
select p.manufacturer, count(distinct s.type),
       count(distinct c.reader)
from caseR c, steps s, locs l, epc_info i, product p
where c.biz_step=s.biz_step and c.biz_loc=l.gln
    and c.epc=i.epc and i.product=p.product
    and c.rtime >= T2
    and l.site = 'distribution center 2'
group by p.manufacturer
```

FIG. 8

METHOD AND SYSTEM FOR CLEANSING SEQUENCE-BASED DATA AT QUERY TIME

This application is a continuation application claiming priority to Ser. No. 11/559,452, filed Nov. 14, 2006, now U.S. Pat. No. 7,516,128, issued Apr. 7, 2009.

FIELD OF THE INVENTION

The present invention relates to a system and method for cleansing sequence-based data at query time.

BACKGROUND OF THE INVENTION

Sequence-based data such as Radio Frequency Identification (RFID) data is being deployed in application areas including supply-chain optimization, business process automation, asset tracking, and problem traceability applications. Sequence-based data reads have anomalies arising from many different sources such as duplicate reads, missed reads and cross reads. Anomalies can also occur at a logical or business process level. A small number of anomalies in RFID reads can translate into large errors in analytical results. Conventional "eager" data cleansing approaches attempt to remove all anomalies upfront, store only the cleaned data in a database, and then apply queries on the cleaned data. This attempted upfront removal of anomalies occurs, for example, during an Extract-Transform-Load (ETL) process that loads cleaned data into a data warehouse. Removal of all such anomalies upfront, however, is not always possible. One reason is that the rules and the business context required for cleansing may not be available at data loading time. For example, the presence of cycles and whether they will affect any analysis may not be known until users observe irregularity in query results some time later. As a result, an application may constantly evolve existing anomaly definitions and add new ones. Further, the rules for correcting data anomalies are often application-specific (i.e., several applications define anomalies and corrections on the same data set differently). For example, a first application queries tracking shelf space planning or labor productivity requires knowledge about all cycles within stores, whereas a second application that calculates how long a product item has stayed in every location needs to remove everything in a cycle except for the first and the last reads. Still further, for certain applications (e.g., pharmaceutical e-pedigree tracking), laws require a preservation of tracking information, thereby precluding upfront data cleansing. Moreover, when different application requirements dictate sets of rules that are dynamically changing, maintaining and adapting multiple cleaned versions is physically prohibitive. Thus, there exists a need to overcome at least one of the preceding deficiencies and limitations of the related art.

SUMMARY OF THE INVENTION

In first embodiments, the present invention provides a computer-implemented method of cleansing anomalies from sequence-based data at query time, comprising:

loading sequence-based data into a database managed by a database management system (DBMS) of a computing system, the loading being performed at a load time of the sequence-based data that precedes a query time of the sequence-based data;

receiving a cleansing rule at a cleansing rules engine of the computing system;

automatically converting, by the cleansing rules engine, the cleansing rule to a template, the template including logic to compensate for one or more anomalies in the sequence-based data;

receiving, at the query time and by a query rewrite engine of the computing system, a user query to retrieve the sequence-based data;

automatically rewriting, at the query time and by the query rewrite engine, the user query to provide a rewritten query, the automatically rewriting including applying the logic included in the template to compensate for the one or more anomalies; and executing, at the query time, the rewritten query by the DBMS, where an answer provided by executing the rewritten query is identical to a result of executing the user query on a set of data generated by an application of the cleansing rule to all of the sequence-based data.

In second embodiments, the present invention provides a computer-implemented method of cleansing anomalies from sequence-based data at query time via a rewrite of a query with respect to multiple cleansing rules, comprising:

loading sequence-based data into a database managed by a database management system (DBMS) of a computing system, the sequence-based data including one or more anomalies;

receiving a plurality of cleansing rules $C_1, \ldots, C_n$ at a cleansing rules engine of the computing system;

receiving, by a query rewrite engine of the computing system, a user query Q to retrieve the sequence-based data;

automatically rewriting the user query by the query rewrite engine to provide a rewritten query;

executing the rewritten query by the DBMS, the executing including generating cleansed data from the sequence-based data, the cleansed data not including the one or more anomalies, wherein the automatically rewriting includes:

for each cleansing rule $C_i$ of the plurality of cleansing rules $C_1, \ldots, C_n$, performing a first loop that includes:

for each context reference X of one or more context references included in a pattern of the cleansing rule $C_i$ on a relational table R, performing a second loop that includes:

setting a correlation condition cr to a list of one or more conjuncts, the one or more conjuncts comprising at least one of: one or more explicit conjuncts included in a condition of the cleansing rule $C_i$ and referring to the context reference X and one or more implied conjuncts, each implied conjunct being on a cluster key of the relational table R or a sequence key of the relational table R, wherein the correlation condition cr is a correlation condition between the context reference X and T, the T being a target reference included in the pattern, if the context reference X is a position-based context reference, then retaining in the one or more conjuncts of the correlation condition cr only position-preserving implied conjuncts, binding s to the target reference X, wherein the s is a query condition on the relational table R and is included in the user query Q, running a transitivity analysis between the correlation condition cr and the query condition s, determining d, the d being a set including any conjunct of the correlation condition cr that refers only to context reference X, and if set d is not empty, adding set d to a context condition $cc_i$, otherwise setting the context condition $cc_i$ to an empty set and breaking out of the second loop, wherein the context condition $cc_i$ defines a context set for context reference X, and if the context condition $cc_i$ is the empty set, breaking out of the first loop, and performing a join-back algorithm to generate the rewritten query; and if no context condition $cc_i$ is the empty set, performing the following:

computing an overall context condition cc as $cc_1 \| cc_2 \ldots \| cc_n$, computing an expanded condition ec as s$\|$cc, wherein the s is a query condition of the user query Q, simplifying the query condition s to an optimized query condition s', the simplifying including setting the optimized query condition s' equal to s–cc, and computing an expanded rewrite query $Q_e$ as the rewritten query, the computing the expanded rewrite query $Q_e$ including utilizing an expression $\sigma_{s'}(\Phi_{Cn} \ldots \Phi_{C1}(\sigma_{ec}(R)))$, wherein each $\Phi_{Ci}(\sigma_{ec}(R))$ of the $\Phi_{Cn} \ldots \Phi_{C1}(\sigma_{ec}(R))$ is a result of applying the cleansing rule $C_i$ on a data set $\sigma_{ec}(R)$, wherein the data set $\sigma_{ec}(R)$ is a result of directly pushing the expanded condition ec to the relational table R and cleansing data of the relational table R selected by the expanded condition ec.

Systems corresponding to the above-summarized methods are also described and claimed herein.

Advantageously, the present invention utilizes rewritten queries to provide a technique that defers sequence-based data cleansing until query time. The rewritten queries are efficient to execute (i.e., reduces the amount of data that needs to be cleaned at query time) and preserve the semantics of sequence constraints (i.e., generating query results that are the same as the results that would have been obtained had the data been cleaned prior to query time using the same rules). Further, the cleansing technique disclosed herein can employ application-specific cleansing rules and allows a user to change cleansing rules at any time. Still further, the present invention avoids the extraction and cleansing of the entire data set before applying a query and allows for the preservation of originally read data.

BRIEF DESCRIPTION OF THE DRAWINGS

FIGS. 3A-3B depict two examples of cleansing rules utilized in the process of FIG. 2, in accordance with embodiments of the present invention.

FIGS. 3C-3D depict two examples of rewriting queries with an expanded rewrite approach, which can be utilized in the process of FIG. 2, in accordance with embodiments of the present invention.

FIG. 4A depicts a process of generating an expanded rewrite for a query in the process of FIG. 2, in accordance with embodiments of the present invention.

FIG. 4B depicts a process of generating an expanded rewrite for a join query in the process of FIG. 2, where all joins are n:1, in accordance with embodiments of the present invention.

FIG. 5 depicts a process of rewriting a query with a join-back approach, which can be utilized in the process of FIG. 2, in accordance with embodiments of the present invention.

FIG. 6 depicts the expanded rewrite process of FIG. 4A extended to support multiple rules, in accordance with embodiments of the present invention.

FIG. 8 depicts two representative benchmark queries used in a test of the effectiveness of the system and process of FIGS. 1 and 2, respectively, in accordance with embodiments of the present invention.

DETAILED DESCRIPTION OF THE INVENTION

1. Overview

The present invention provides a method and system for deferring cleansing of sequence-based data (e.g., RFID data) until query time. As used herein, cleansing (a.k.a. data cleansing or cleaning) is a processing of one or more anomalies in sequence-based data to produce more reliable data. As used herein, sequence-based data is defined as a collection of tuple (i.e., a row with a fixed number of attributes) sets where each set consists of a list of tuples in an order determined by one or more attributes in each tuple. In the deferred cleansing approach disclosed herein, each application specifies its own anomalies by defining declarative sequence-based rules (a.k.a. cleansing rules) for cleansing sequence-based data stored in a database. The cleansing rules do not change the content of the database directly, but are evaluated when an application issues a query. The present invention utilizes two novel approaches of automatically rewriting application queries at query time. Both of the disclosed rewrite approaches reduce the amount of data to be cleaned by exploiting predicates in the application queries while guaranteeing correct answers to the queries. Further, the present invention provides an efficient evaluation of the cleansing rules by utilizing SQL/OLAP functionality to implement cleansing rules specified in a declarative sequence-based language. The deferred cleansing technique of the present invention makes it feasible for different applications to employ different cleansing rules and allows cleansing rules to be changed by a user at any time. Experimental results disclosed herein show that the present invention's deferred cleansing technique is affordable for typical analytic queries over RFID data. In one embodiment, the disclosed deferred cleansing approach complements the eager data cleansing approach. Known anomalies in sequence-based data whose detection and correction is common to all consumers of the data are still handled eagerly, but the detection and correction of other anomalies is deferred until query time.

The rest of this application is organized as follows: High level views of the deferred cleansing system and method are described in Sections 2 and 3. Section 4 describes the approach of the present invention for specifying cleansing rules in Simple Query Language for Time Series (SQL-TS) and the exploitation of SQL/On Line Analytical Processing (SQL/OLAP) for efficient evaluation. Section 4 also provides example rules for detecting and correcting errors in several scenarios. Section 5 presents mechanisms for rewriting user queries based on cleansing rules and shows how these rewrites can be optimized. Experimental results that evaluate the benefits of deferred cleansing are presented in Section 6. Section 7 includes a description of a computing system that implements the deferred cleansing process.

2. Deferred Cleansing System

Figure 1:
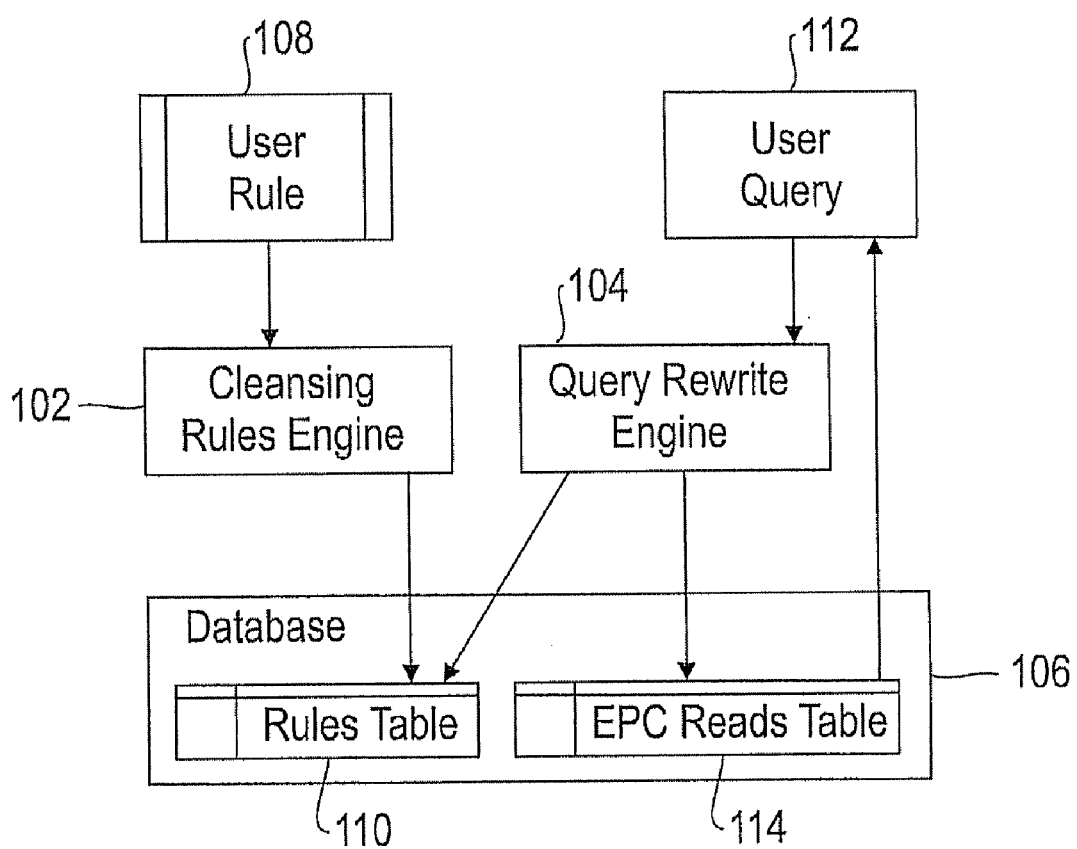
FIG. 1 is a block diagram of a system for cleansing sequence-based data at query time, in accordance with embodiments of the present invention.

FIG. 1 is a block diagram of a system 100 for cleansing of sequence-based data at query time, in accordance with embodiments of the present invention. System 100 includes a Cleansing Rule engine 102, a Query Rewrite engine 104, and a database management system (DBMS) 106 (a.k.a. database or database engine). Cleansing Rule engine 102 and Query Rewrite engine 104 are implemented, for example, in Java above the DBMS. Cleansing Rule engine 102 and Query Rewrite engine 104 are extensible and are not proprietary to any DBMS vendor. A user or application-generated rule 108 is received by Cleansing Rule Engine 102 and converted into a template having a rule pattern, condition(s), and action clause(s). The template is stored in a rules table 110 residing in database 106 for use by Query Rewrite Engine 104 to rewrite a user SQL query 112. A reads table 114 (a.k.a. input table) residing in database 106 includes sequence-based data to be cleansed by the execution of the rewritten query. Reads table 114 is, for example, an Electronic Product Code (EPC) reads table. EPC is a coding scheme that uniquely identifies individual objects using RFID tags.

3. Deferred Cleansing Process

Figure 2:
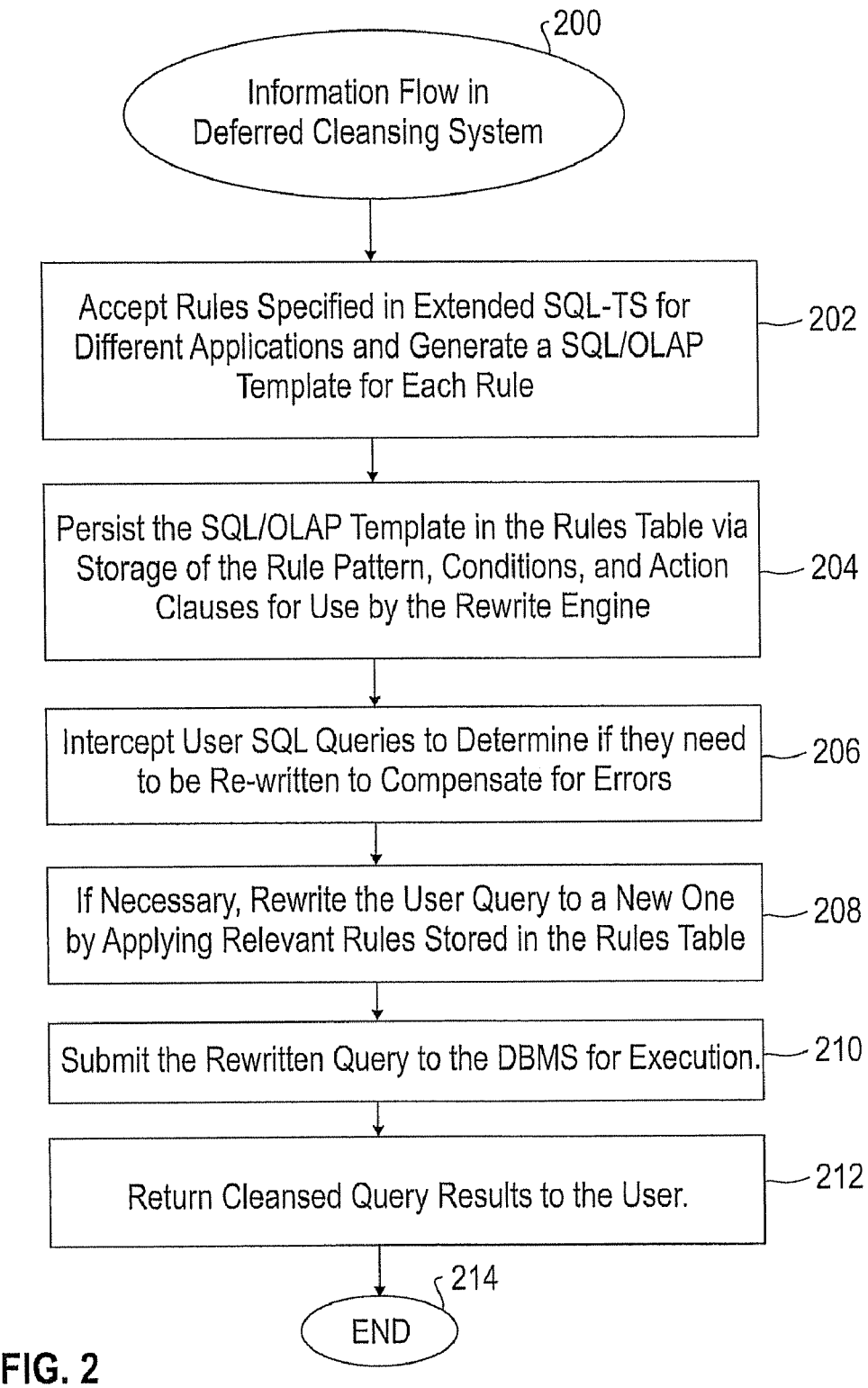
FIG. 2 is a flow diagram of a process of cleansing sequence-based data at query time in the system of FIG. 1, in accordance with embodiments of the present invention.

FIG. 2 is a flow diagram of a process of cleansing sequence-based data at query time in the system of FIG. 1, in accordance with embodiments of the present invention. The process of cleansing sequence-based data is also referred to herein as a deferred cleansing process. The deferred cleansing process begins at step 200. In step 202, Cleansing Rules engine 102 (see FIG. 1) receives one or more user or application-defined cleansing rules specified in extended SQL-TS for different applications and generates a SQL/OLAP template for each rule. That is, each cleansing rule is converted into a SQL/OLAP template. The SQL/OLAP template encapsulates logic to detect and compensate for one or more anomalies in the sequence-based data and is plugged in at query time.

In step 204, the SQL/OLAP template is sent from Cleansing Rules engine 102 (see FIG. 1) to database 106 (see FIG. 1), where the template is persisted in rules table 110. Specifically, the rule pattern, conditions, and action clauses included in the template are stored in rules table 110 (see FIG. 1) for use by Query Rewrite engine 104 (see FIG. 1). In step 206, Query Rewrite engine 104 (see FIG. 1) intercepts user SQL queries 112 (see FIG. 1) and determines which of queries 112 (see FIG. 1) need to be rewritten to compensate for anomalies. If necessary, Query Rewrite engine 104 (see FIG. 1) rewrites user query 112 (see FIG. 1) to a new query (a.k.a. the rewritten query) in step 208 by applying one or more relevant rules stored in rules table 110 (see FIG. 1).

In step 210, Query Rewrite engine 104 (see FIG. 1) submits the rewritten query to database 106 (see FIG. 1) to be executed to cleanse sequence-based data stored in a reads table (e.g., an EPC reads table 114 of FIG. 1). The result of the execution of the rewritten query is a cleansed query result. In step 212, database 106 (see FIG. 1) returns the cleansed query result to the user. The deferred cleansing process ends at step 214.

In one embodiment, one of the algorithms described below (see FIGS. 4A, 4B, 5 and 6) is performed in step 208. These algorithms include (1) reducing the sequence-based data to a subset of the sequence-based data, where the subset is to be used in the generation of the cleansed data, and then (2) executing logic included in the original user query on the cleansed data, where steps (1) and (2) ensure that the result of the rewritten query execution (see step 210) is identical to a result of executing the original user query 112 (see FIG. 1) on a set of data generated by an application of the cleansing rule(s) to all of the sequence-based data.

4. Cleansing Rules

The examples in this section illustrate how anomalies in RFID data are detected and corrected using declarative cleansing rules. The examples assume that the reads of all RFID tags are stored in a relational table R whose schema is depicted below as Schema 1. Table R is an example of EPC reads table 114 (see FIG. 1).

Schema 1:

TABLE R

| Schema (for RFID reads) | |
|---|---|
| epc, | RFID tag identifier |
| rtime, | time when tag is read by a reader |
| reader, | identifier of reader that reads the tag |
| biz_loc, | business location where tag is read |
| biz_step, | business steps associated with the read |

4.1 Cleansing Rules Language Considerations

The present invention views RFID data as a set of EPC sequences, each of which consists of all reads of a particular RFID tag in rtime order. Such a model makes it convenient to detect various types of anomalies for RFID applications. SQL/OLAP functions (i.e., part of the SQL99 standard) are exploited for processing EPC sequences. For example, to detect and filter duplicate reads, the following SQL statement is used:

```
with v1 as (
  select biz_loc as loc_current,
    max(biz_loc) over (partition by epc order by rtime asc
    rows between 1 preceding and 1 preceding) as loc_before
  from R      )
select * from v1
where loc_current != loc_before or loc_before is null;
```

A key part of the SQL statement presented above is the utilization of SQL/OLAP for computing the column loc_before. SQL/OLAP uses the partition by and the order by clauses to define the input as a set of sequences, and allows, for each row r, a definition of a scalar aggregate on a window (i.e., a window within a sequence) relative to r. In this example, the input is defined as EPC sequences and a window is specified by the rows clause with a single row before each row r in sequence order. The biz_loc of the previous row in the window can be extracted using a scalar aggregate. The locations of two consecutive reads are then compared to remove duplicates. The second disjunct in the where clause handles borderline rows that have no rows before them in a sequence.

Exploiting SQL/OLAP for sequence processing has several advantages: (1) it is more efficient than SQL using self joins or subqueries (e.g., the SQL statement presented above can be executed by making a single pass over table R in a sorted order); (2) it is integrated inside the database engine and therefore automatically benefits from DBMS features such as optimization and parallelism; (3) it is standardized and supported by leading DBMS vendors.

The main drawback of using SQL/OLAP is its redundancy in syntax. For example, to retrieve a column value from a previous row, a relatively complex scalar aggregate must be specified. If multiple columns are needed, each requires its own scalar aggregate specification. Such redundancy makes it difficult for users to express cleansing rules directly in SQL/OLAP.

One embodiment overcomes this drawback by utilizing an extension of the syntax of SQL-TS, a natural sequence language, where the extension facilitates defining cleansing rules. The technique described herein compares SQL-TS rule predicates with predicates specified in the user query to determine the data that needs to be cleaned. Once a rule is defined in the extended SQL-TS, an automatically generated template in SQL/OLAP is used at query time for efficient execution (i.e., efficient evaluation of the rule). Section 4.2 describes a SQL-TS based rule language and shows how rules expressed in such a language can be mapped to a SQL implementation. Several examples in Section 4.3 demonstrate how the extended SQL-TS can be used to specify cleansing rules. Section 4.4 discusses the issue of rule ordering.

4.2 SQL-TS Based Cleansing Rules

A SQL-TS based rule grammar is shown in Table 1 and described below. Except for the entries in italics, all clauses in Table 1 are borrowed from SQL-TS.

TABLE 1

| DEFINE | [rule name] |
|---|---|
| ON | [table name] |
| FROM | [table name] |
| CLUSTER BY | [cluster key] |
| SEQUENCE BY | [sequence key] |
| AS | [pattern] |
| WHERE | [condition] |
| ACTION | [DELETE | MODIFY | KEEP] |

The CLUSTER BY and the SEQUENCE BY clauses in Table 1 are similar to the 'partition by' and 'order by' clauses in SQL/OLAP and define how to convert the input data to sequence sets. In one embodiment, the cluster key is epc and the sequence key is rtime. The main simplification comes from the pattern specification in the AS clause. A pattern defines an ordered list of references. If a reference is not designated with a * sign, it refers to a single row in the input. A reference with a * sign can appear only at the beginning or the end of the pattern, and refers to a set of rows either before or after a row bound to a singleton reference within a sequence. A condition in a WHERE clause is specified on columns of the pattern references. For example, duplicate detection can be expressed in SQL-TS as:

AS($A,B$) WHERE $A$.biz_loc!=$B$.biz_loc

References A and B each refer to a single row and the pattern implies that the two rows are adjacent in a sequence. Compared to SQL/OLAP, the specification of the two consecutive reads in SQL-TS is simpler and more intuitive. A condition on a set reference with a * sign has the existential semantics (i.e., the condition is true if any row in the set makes it true). It should be noted that the aforementioned semantics differ slightly from the one used in the original SQL-TS. An example having the above-described semantics is included in Section 4.3.

The present invention's rule language extends SQL-TS in two ways. First, an ACTION clause is added that specifies how to fix anomalies when the condition in the WHERE clause is satisfied. An action is specified on a singleton reference defined in the pattern. In one embodiment, the action is any of DELETE, MODIFY and KEEP. Using both DELETE and KEEP provides more flexibility since it is sometimes more intuitive for users to specify reads to remove, instead of retain, or vice versa. MODIFY changes the value of any column in a row. If a column to be modified does not exist, a new column is created on the fly. Note that an action does not directly change what is stored in the input table, but controls what flows out of it. In one embodiment, the present invention deliberately excludes INSERT from the ACTION clause, since direct insertion is often not useful. Second, the present invention separates the table on which a rule is defined (i.e., by the ON clause) and the table from which the rule obtains the input (i.e., by the FROM clause). In the remaining examples herein, it is assumed that a rule is always defined on the reads table R. However, an application can choose to use an input including data in R as well as some extra data for reference or compensation (e.g., handling missed reads in Example 5 in Section 4.3). In this way, the present invention supports insertion without an explicit insertion in the ACTION clause. The input table is required to have a schema including all columns in R, and may optionally include one or more extra columns. The rule condition can refer to any column in the input table.

A cleansing rule can always be converted to an implementation in SQL/OLAP. The conversion of the cluster by and the sequence by clauses will be apparent to those skilled in the art. The discussion below focuses on the conversion of the WHERE and the ACTION clauses. If a rule condition refers to two singletons, one of them can be specified in SQL/OLAP as a number of scalar aggregates (i.e., one scalar aggregate for each needed column) over a window of size one. The window is defined according to the relative sequence positions of the two singletons. If a rule condition refers to a set and a singleton, a window is defined to include the set and the rule condition is converted to a "case" expression over the window. A scalar aggregate is used to determine whether any row in the set tests to true. The DELETE and KEEP actions are implemented as filter conditions in SQL. The rule condition is used directly as the filter for KEEP and is negated for DELETE with proper handling of the null semantics. Finally, MODIFY can be handled by another "case" expression, as is shown in Section 4.3.

4.3 Cleansing Rule Examples

The examples in this section illustrate how cleansing rules are defined using the extended SQL-TS. Only the pattern, condition and action specifications are shown for each rule. Unless otherwise indicated, a rule is always on table R, from table R, clustered by epc, and sequenced by rtime. In these examples, the rules are manually specified and in some cases, parts of the SQL/OLAP implementation of the rules are highlighted.

4.3.1 Example 1 (Duplicate Rule)

Although most duplicates can be fixed at the edge, a small number of them survive for reasons such as edge server restart. In Rule 1 shown below, duplicate removal is restricted to only reads that are t1 minutes apart, where t1 can be customized for different applications. In one embodiment, the first read among duplicates is selected to be kept.

Rule 1:

| Pattern | Condition | Action |
|---------|-----------|--------|
| (A, B)  | A.biz_loc = B.biz_loc and B.rtime − A.rtime < t1 mins | DELETE B |

The SQL/OLAP implementation is similar to the implementation shown in Section 4.1.

4.3.2 Example 2 (Reader Rule)

Consider a scenario in which a forklift equipped with an RFID reader (referred to herein as readerX) carries a tagged case to a destination in a warehouse. Upon reaching the destination, readerX reads the EPC on the case and a pre-installed location tag at the destination and generates a new read. During transportation, the case on the forklift may be accidentally read by other readers (e.g., a reader on a docking door). If it is found that such transportation takes up to t2 minutes, then Rule 2 is defined as shown below to remove all reads recorded t2 minutes before a read by readerX. It should be noted that the * designates B as a set reference.

Rule 2:

| Pattern | Condition | Action |
|---------|-----------|--------|
| (A, *B) | B.reader = 'readerX' and B.rtime − A.rtime < t2 mins | DELETE A |

The reader rule can be implemented in SQL/OLAP by defining a scalar aggregate "has_readerX_after":

```
max(case when reader = 'readerX' then 1 else 0 end)
  over (range between 1 macro sec following
        and t2 min following) as has_readerX_after
```

Note that the window is constructed by exploiting the constraint on the sequence key rtime to include rows to which B refers. Rows whose has_readerX_after is set to 1 are then filtered out.

4.3.3 Example 3 (Replacing Rule)

Suppose readers at two locations 'loc1' and 'loc2' are close to each other and can incur cross reads. Further, suppose that because of the business flow, a shipment being read at 'loc1' is always read at another location 'locA' next, within t3 minutes. Rule 3 is then used to detect the anomaly and modify its location.

Rule 3:

| Pattern | Condition | Action |
|---------|-----------|--------|
| (A, B)  | A.biz_loc = 'loc2' and B.biz_loc = 'locA' and B.rtime−A.rtime < t3 mins | MODIFY A.biz_loc='loc1' |

The SQL implementation of the MODIFY action is a "case" expression that either keeps biz_loc as it is or changes it to 'loc1' depending on the test of a condition.

4.3.4 Example 4 (Cycle Rule)

Suppose that an application does not want to see reads back and forth between a set of locations. Hence a location pattern such as [X Y X Y X Y] for an EPC should be changed to [X Y], keeping only the first X and the last Y. This change can be achieved by the following cycle rule shown in Rule 4. Another, more involved rule can be generated that removes cycles of arbitrary length.

Rule 4:

| Pattern  | Condition | Action |
|----------|-----------|--------|
| (A, B, C)| A.biz_loc=C.biz_loc and A.biz_loc != B.biz_loc | DELETE B |

4.3.5 Example 5 (Missing Rule)

In this example, a pallet and cases in it are known to travel together along a certain business path. Pallet tags are always readable, but due to the orientation of the tag and contents, cases are not always read at every location. Suppose that at location L1, pallet P is read, but a case C in P is not. It is determined with confidence that C in fact missed a read (instead of being stolen) if some time later, there is a read of C and P together again at some location L2. In that case, to compensate for the missing read of C at L1, the pallet read at L1 is converted to a case read (e.g., replacing P's epc with C's epc).

Below, the missing rule is specified in two sub-rules r1 and r2. Both r1 and r2 are defined on table R, which in this example contains only case reads. The input (i.e., in the FROM clause) to r1 is not R, but a derived table of the same schema as Schema 1, with an extra column "is_pallet". The details regarding how this input is derived are included in Section 6. For this example it is assumed that the derived table is a union of R and another set R'. For a pallet P containing n cases, there are n copies of every read of P in R' and the epc of each copy is set to each case epc. While R has the 'actual' reads for the cases, R' contains the 'expected' case reads based on the more reliable pallet reads. Every row in R and R' has is_pallet set to 0 and 1, respectively.

Rule r1 uses A to reference a pallet read and then checks if A has a nearby case read at the same location. If so, a flag "has_case_nearby" is set, which indicates no missing reads at that location. The output of r1 is pipelined to Rule r2. Rule r2 keeps all original case reads, plus the pallet reads without a nearby case read, as long as the same case is read later together with the pallet. Note that the preserved pallet reads compensate for the missing case reads.

Rules r1 and r2:

|            | Condition | Action |
|------------|-----------|--------|
| r1. Pattern |          |        |
| (X,A,Y)    | A.is_pallet=1 and ( (X.is_pallet=0 and A.biz_loc=X.biz_loc and A.rtime−X.rtime<5 mins) OR (Y.is_pallet=0 and A.biz_loc=Y.biz_loc and Y.rtime−A.rtime<5 mins) ) | MODIFY A.has_case_nearby=1 |

-continued

| | Condition | Action |
|---|---|---|
| r2. Pattern | | |
| (A,*B) | A.is_pallet=0 or (A.has_case_nearby=0 and B.has_case_nearby=1) | KEEP A |

To express r1 in SQL, has_case_nearby can be computed by a single scalar aggregate over a window including a row r, a row before and a row after r, since the condition on X and Y are the same. Rule r2 can be implemented in SQL with methods similar to those shown in Example 2.

SQL/OLAP is richer than SQL-TS for expressing conditions. For example, to control the number of reads by readerX that should be observed before taking an action, the scalar aggregate for computing "has_readerX_after" in Example 2 is changed from max( ) to count( ).

4.4 Rule Ordering

When an application defines multiple rules on the same table, their input table must be the same. Often, there is a dependency among rules and their ordering is important. Consider the location of a sequence of tag reads given by [X Y X]. Applying the cycle rule first, followed by the duplicate rule without constraint on rtime, the cleaned sequence becomes [X] (i.e., the first X). If the two rules are switched, the result is [X X] instead. In the present invention, rules are ordered by their creation time and applied in this order.

5. Rewriting Queries using Cleansing Rules

Given a user query Q and a cleansing rule C defined on R, the correct answer to Q with respect to C is denoted as Q[C]. As used herein, $\Phi_C(d)$ is defined as the result of applying rule C on a data set d including all columns in R's schema (see Schema 1 presented above). By definition, Q[C] can be computed by replacing all references to R in Q with $\Phi_C(R)$. Such a computation requires cleaning all data in R and thus is prohibitive. This section describes how deferred cleansing can be performed through more efficient query rewrites. Section 5.1 shows why pushing predicates in Q to R directly does not always produce the correct answer and illustrates two efficient query rewrite approaches that preserve the query semantics. Techniques to generate these two types of rewrites are described in Sections 5.2 and 5.3, in the presence of a single cleansing rule. In Section 5.4, the rewrite approaches are extended to support multiple rules. In Section 5, the input to C is also table R, but the disclosed rewrite techniques can be implemented with other inputs to C.

5.1 Motivation for Rewriting Queries

To reduce the amount of data to be cleaned, it is tempting to push predicates in Q directly to R first and then to apply rule C, followed by the evaluation of the rest of Q. Unfortunately, this scheme does not always return the correct answer for Q[C].

Consider a cleansing rule C1 300 in FIG. 3A defined on table R1 and query Q1, as shown in FIG. 3A. Cleansing rule C1 is defined as the reader rule in Section 4.3. An rid field is used to identify rows in a table. Applying C1 on R1 will remove row r1 because there is a read by readerX subsequently within 5 minutes. The remaining row r2 does not satisfy the condition in Q1 and the correct answer to Q1[C1] is { }. If Q1's condition "rtime<t1" is pushed on R1 first, only row r1 qualifies. Applying C1 on {r1} does not remove r1 this time since r2 is no longer present. Thus, an incorrect answer {r1} is obtained.

As another example, consider a cleansing rule C2 320 of FIG. 3B defined on table R2 and another query Q2, as shown in FIG. 3B. Note that C2 is a modified version of the duplicate rule in Section 4.3 obtained by omitting the time constraint. Applying C2 on R2 produces {r3} because r4 is a duplicate. Since r3 has an rtime no greater than t2, the correct answer for Q2[C2] is again { }. However, if the condition in Q2 is applied on R2 first before cleansing, only r4 is selected. Applying C2 on {r4} does not remove r4 since it is the only element in the set. Again, the incorrect answer {r4} is obtained.

Both Q1 [C1] and Q2[C2] can still be answered more efficiently. For instance, Q1[C1] can be computed using an expression $e1 = \sigma_{rtime<t1}(\Phi_{C1}(\sigma_{rtime<t1+5}(R1)))$. From C1's condition it is apparent that in order for a read r in R1 to be deleted, another read by readerX that trails r by 5 minutes or less is needed. By relaxing the original condition in Q1 slightly, e1 obtains enough data to remove all reads relevant to Q1. Cleansing is then applied on this slightly larger data set. Finally, e1 reapplies the original condition to remove the extra data that is needed only for cleansing.

A similar approach cannot directly be used for Q2[C2] because in C2, two duplicate reads can be arbitrarily far apart in time due to the time constraint having been removed from the original duplicate rule. Nevertheless, Q2[C2] can be alternatively answered by $e2 = \sigma_{rtime>t2}(\Phi_{C2}(R2 \leftrightarrow_{epc} \Pi_{epc}(\sigma_{rtime>t2}(R2))))$, where $\leftrightarrow_{epc}$ represents a natural join on epc between two tables, and $\Pi_{epc}$ projects the input on epc and removes duplicates. Observe that C2 only removes rows from an input sequence. Therefore, there is only a need to clean sequences that include at least one read satisfying the condition in Q2. The remaining sequences are not relevant because even if they are cleaned, no reads will be selected by Q2 anyway. The precise cleaning of only relevant sequences is exactly what e2 does. First, e2 identifies sequences that have to be cleaned and then e2 revisits R2 to extract all data on those identified sequences. Cleansing such a data set guarantees that all relevant anomalies are removed. Similar to e1, e2 reapplies the original condition in the end to filter out data no longer needed after cleansing. As will be shown in Section 6, because the condition in typical RFID queries tends to correlate with the sequence key, the relevant sequence set can be limited effectively using this approach. As one skilled in the art can easily verify, e1 and e2 produce the correct answers for Q1[C1] and Q2[C2], respectively.

For several reasons, it is difficult for a conventional query optimizer to automatically generate rewrites such as e1 and e2. First, SQL/OLAP, while providing a more efficient way of bringing together different rows from the same table than self joins, hides the original row identity inside scalar aggregates and Boolean expressions, as is shown above in Section 4.3. This aspect of SQL/OLAP makes it difficult for the optimizer to perform effective transitivity analysis. Second, a cleansing rule may have multiple equivalent SQL/OLAP implementations. It is difficult for an optimizer to recognize that such different query representations originate from the same rule logic and then to apply the same rewrite.

Instead of enhancing a conventional optimizer, the present invention includes a query rewrite unit outside database engine 106, where the query rewrite unit takes a set of cleansing rules and a user query, and generates a rewritten query that provides the correct answer with respect to those cleansing rules. Because the query rewrite unit is at the rule level, it transforms queries more effectively than a DBMS optimizer. The next two sections describe two styles of query rewrites: expanded (e.g., e1) and join-back (e.g., e2).

5.2 Expanded Rewrite

This section describes the expanded query rewrite approach. In this section, it is assumed that only a single cleansing rule C is defined on table R. Support for multiple cleansing rules is described in Section 5.4.

Definition 1. The pattern in a cleansing rule C specifies two types of data references: a target reference and a context reference. The former is the reference used in the action part of C and a cleansing rule has only one target reference. The rest of the references in the pattern are context references. For example, in FIG. 3A, reference A is a target reference and B (underlined) is the context reference. As another example, in FIG. 3B, reference F is a target reference while reference E (underlined) is a context reference.

A target reference T and a context reference X both refer to row sets in table R, but they are not independent. A condition that links T and X is a correlation condition. Some correlation conditions are given explicitly in the rule condition and others are implied in the rule pattern specification. Consider a user query Q given by $\sigma_s(R)$. Because the only data that needs to be cleaned is the data relevant to the query, Q binds T to a row set $R_T = \sigma_s(R)$. Through a correlation condition cr, the context reference X is in turn bound to another row set $R_X$ referred to as the context set. $R_T$ and $R_X$ may overlap. $R_X$ is the set of rows required in order to determine whether to take any action on one or more rows in $R_T$. The key is to select from R, not only the query data $R_T$, but also the context set $R_X$, so that all necessary cleansing can be performed. The direct pushdown approach described in the previous section fails because it ignores data present only in the context sets.

A new condition is derived referencing only the context reference X by binding query condition s to the target reference T and running a transitivity analysis on s and the correlation condition between T and X. The new condition defines the context set for X and is referred to herein as a context condition. The context condition is utilized together with s to limit the amount of data extracted from R for cleansing. A correlation condition between T and X includes all conjuncts in the rule condition that refer to both T and X, as well as conjuncts that are implied in the rule pattern. There are two types of implied conjuncts, one on the cluster key ckey and another on the sequence key skey. Both ckey and skey are given in the rule definition and, in one embodiment, are bound to columns epc and rtime, respectively. If both X and T refer to rows within the same sequence defined by ckey, then a conjunct X.ckey=T.ckey is indicated. If X is listed before T in the pattern, another conjunct X.skey<T.skey is indicated. Further, if X is listed after T in the pattern, then still another conjunct X.skey>T.skey is indicated. Adding both types of implied conjuncts for transitivity analysis allows a stronger context condition to be derived.

For context references without a * in the rule pattern, which are referred to herein as position-based context references, there is a third implied correlation conjunct on sequence position (spos). For example, from the pattern in rule C2 in FIG. 3B, a conjunct E.spos=F.spos−1 is implied and it is stronger than E.skey<F.skey. Such a conjunct does not exist between context reference B, which has a *, and target reference A in rule C1 in FIG. 3A, because the exact relative position of B to A is not important. Dealing with the implied conjunct on spos is subtle. The main difficulty comes from the fact that sequence positions typically are not materialized in the input data, but are computed oh the fly. Thus, when determining the context condition, care is taken not to change the relative position of selected rows.

Definition 2. Consider a correlation condition cr between a target reference T and a context reference X. Correlation condition cr is position-preserving if for any given row r referred to by T, the context set V (computed through cr) for r has the following property: for every row v in V, all rows between v and r in the original sequence also belong to V. Note that within any data set from R containing both V and {r}, the sequence position of any row in V relative to r is the same as that in R.

Observations: (a) The following correlation conditions between a target reference T and a context reference X are position-preserving: (1) X.ckey=T.ckey; (2) X.skey<T.skey and X.skey>T.skey−t, if X is before T in C's pattern; X.skey>T.skey and X.skey<T.skey+t, if X is after T in C's pattern, where t is a positive constant. (b) Any correlation condition on columns other than ckey and skey is not position-preserving. Observation (a) follows from Definition 2. The reason for Observation (b) is that for any such correlation condition cr, it is always possible to construct a counter example by making the column used in cr independent of the sequence key.

Therefore, for position-based context references, all conjuncts are not included in the correlation condition for transitivity analysis. Instead, only those that are position-preserving are retained.

FIG. 4A includes a process 400 (i.e., an algorithm) for generating an expanded rewrite for a query in the process of FIG. 2. Algorithm 400 relative to generating an expanded rewrite for Q[C] is described as follows: From line 2 to line 10 in FIG. 4A, is a loop iterating through each context reference X included in the pattern of cleansing rule C. Depending on whether X is position-based or not (see lines 4-5 of FIG. 4A), the correlation condition between X and the target reference T is prepared accordingly, as a list of conjuncts. Query condition s is bound to T, where s is a query condition on a relational table R in a user query Q. Transitivity analysis is then applied between the correlation condition cr and the query condition s (see line 6 of FIG. 4A). If any conjunct can be derived referencing X only, it is added to the context condition cc (see lines 7-8 of FIG. 4A). If there are multiple context references, context conditions are or-ed together to select the combined context sets. If any context condition cannot be derived, it is set to empty and there is a break out of the "for" loop (see line 9 of FIG. 4A). From line 11 to line 13 in FIG. 4A, if the context condition is not empty, the expanded rewrite $Q_e$ is generated. First, an expanded condition ec is computed as s∥cc (see line 12 of FIG. 4A) and it becomes the predicate that can be pushed to R directly. After performing cleansing on the data set selected by ec, s is applied again to remove rows in the context set that are no longer needed. An optimization is used to simplify s to s', by avoiding reapplying conjuncts in s already covered in the context condition (see line 12 of FIG. 4A). Finally, $Q_e$ is provided by an expression $\sigma_{s'}(\Phi_c(\sigma_{ec}(R)))$ (see line 12 of FIG. 4A).

Theorem 1. $Q_e$ computed by algorithm 400 in FIG. 4A provides the correct answer to Q[C].

Proof: For each row r not selected by ec, r is not needed either directly by Q, or indirectly in order to clean any row of interest to Q. Therefore, not selecting r does not change the query semantics.

The running examples in FIGS. 3C and 3D illustrate algorithm 400 of FIG. 4A. A first running example 340 shown in FIG. 3C is based on rule C1 and query Q1. Because context reference B is not position-based, all four conjuncts (listed as cr1 in FIG. 3C), including implied ones, that correlate B to target reference A can be used for deriving the context condition. In FIG. 3C, the condition specified in query Q1 is given by s1, only now bound to A. By computing transitivity on s1 and cr1, the context condition cc1 in FIG. 3C includes a newly derived conjunct B.rtime<t1+5 min and another one directly from cr1. The expanded condition in FIG. 3C is given by ec1, which can be relaxed to rtime<t1+5 min (see e1 in Section 5.1), if the second conjunct is not very selective.

A second running example 360 in FIG. 3D is based on rule C2 and query Q2. Since C2 has a position-based context reference E, only the two position-preserving conjuncts can be used as the correlation condition (listed as cr2 in FIG. 3D). However, no conjuncts can be derived on E through transitivity analysis between cr2 and s2. Therefore, the expanded rewrite is not feasible for Q2. Section 5.3 discusses how to handle Q2 using the join-back rewrite.

Join Query Support: When Q contains joins of $\sigma_s(R)$ to other tables, in general, $Q_e$ is generated for $\sigma_s(R)$ first and then $Q_e$ is joined with the rest of the tables. However, for a certain class of queries, it is possible to do the joins before cleansing. FIG. 4B depicts an algorithm 450 that generates an expanded rewrite for a join query, where all joins are n to 1. The input for algorithm 450 includes a query Q of the form $\sigma_s R \leftrightarrow_{K1} \sigma_{S1} D \leftrightarrow \ldots \leftrightarrow_{Kn} \sigma_{Sn} D_n$, where table R joins each table $D_i$ on column Ki and all joins are n to 1. Queries of this type are common since the reads table is typically joined only with other reference tables. Each join condition can be converted to a conjunct of $R.K_i$ in (select $K_i$ from $D_i$ where $S_i$) such that it looks like a local condition on R (see line 5 of FIG. 4B). Algorithm 400 in FIG. 4A is then applied as before (see line 6 of FIG. 4B). After the transitivity analysis, some of those "in" conjuncts are derived on the context reference and are added to the context condition. Those conjuncts are referred to as $P_i$ on tables $D'_i$, for i from 1 to m<=n. Since each $P_i$ can be converted back to a join condition, this means that each table $D'_i$ can be joined to R before cleansing is applied. If all "in" conjuncts are derived on the context reference, then a new SQL statement is generated using algorithm 400 of FIG. 4A and the "in" predicates are converted back to joins (see line 7 of FIG. 4B). While pushing local predicates before the more expensive cleansing step is always advantageous, whether to apply a join before cleansing depends on factors such as their relative cost and selectivity. There are $2^m$ possible ways of pushing the m $D'_i$ tables before cleansing and trying them all is too expensive. Instead, a heuristic is employed that favors tables with more restrictive local predicates. Specifically, $D'_i$ is ordered by the selectivity of $S'_i$ ascendingly (see line 1 of FIG. 4B). The selectivity of each $S'_i$ can be obtained from the execution plan of the original query Q after compiling it in a DBMS. Then m+1 SQL statements are generated as follows (see lines 2-4 of FIG. 4B): The first SQL statement defers all joins after cleansing. Each of the next m SQL statements pushes one more table $D'_i$ in selectivity order before cleansing. Up to m+1 of the generated SQL statements are then compiled by the DBMS optimizer and the SQL statement with the cheapest cost estimate is selected as the expanded rewrite (see line 8 of FIG. 4B). As used herein, a cost or a cost estimate of a statement, predicate, query or algorithm refers to an amount of computational resources (e.g., memory, cycles, I/O) required to execute the statement, predicate, query or algorithm.

5.3 Join-Back Rewrite

FIG. 5 depicts a process (i.e., algorithm) 500 of rewriting a query with a join-back rewrite approach, which can be utilized in the process of FIG. 2, in accordance with embodiments of the present invention. When the context condition is empty, the expanded rewrite is not feasible since no conditions can be pushed before cleansing. Unlike the expanded rewrite, the join-back rewrite approach of FIG. 5 is always applicable. In the join-back rewrite approach, non-relevant sequences are removed early such that cleansing needs to be applied only on a smaller number of sequences. Again, consider a query $Q=\sigma_s(R)$. Expression $\Pi_{ckey}(\sigma_s(R))$ defines all the sequences in R that Q is interested in, because rule C only deletes rows from or modifies rows in (but does not insert rows into) R. Going back to table R and fetching all rows that belong to those defined sequences will provide enough data to perform the correct cleansing. The join-back rewrite for Q[C] is given by $Q_j=\sigma_s(\Phi_c(R \leftrightarrow_{ckey} \Pi_{ckey}(\sigma_s(R))))$. The derivation of expression e2 to answer Q2[C2] in Section 5.1 uses the join-back rewrite approach.

Even when the expanded rewrite approach is applicable, the join-back approach can be more efficient. The tradeoff is that the expanded rewrite approach selects more rows from R at the beginning than the join-back approach (since ec is typically less restrictive than s), but does not need to join R a second time afterwards. Furthermore, expanded rewrite can take advantage of the expanded condition generated by algorithm 400 of FIG. 4A. Given a sequence in R, the expanded condition selects all rows in it that are needed for the query as well as for cleansing. Thus, during join-back, only rows that qualify the expanded condition are required to be brought back. The improved join-back rewrite is given by $Q_j=\sigma_s(\Phi_c(\sigma_{ec}(R) \leftrightarrow_{ckey} \Pi_{ckey}(\sigma_s(R))))$. As an example, Q1[C1] in Section 5.1 can also be answered by the join-back rewrite: $\sigma_{rtime<t1}(\Phi_{C1}(\sigma_{rtime<t1+5}(R1 \leftrightarrow_{epc} \Pi_{epc}(\sigma_{rtime<t1}(R1))))$.

The join-back rewrite can also be extended to support join queries. Consider the join query Q in the form of $\sigma_s R \leftrightarrow_{JC1} \sigma_{S1} D_1 \leftrightarrow \ldots \leftrightarrow_{JCN} \sigma_{Sn} D_n$, where $JC_i$ indicates a plurality of join conditions. The relevant sequence set is limited by performing a semi-join between each $D_i$ and R, using $\Pi_{ckey}(\sigma_s R \leftrightarrow_{JCi} \sigma_{Si} D_i)$. Again, there are tradeoffs on how many semi-joins to apply before cleansing. Pushing more semi-joins reduces the amount of data to be cleaned, but increases the join overhead. Following the heuristic used in Section 5.2, $D_i$ is ordered in ascending selectivity of $S_i$ (see line 1 in FIG. 5). Then n+1 SQL queries are generated, pushing from 0 to n semi-joins in that order before cleansing (see lines 2-5 in FIG. 5). The query with the cheapest cost estimate by the DBMS is picked as the join-back rewrite (see line 6 in FIG. 5). Finally, the expanded rewrite is compared with the join-back rewrite and the rewrite with a lower cost estimate for execution is selected.

5.4 Supporting Multiple Rules

FIG. 6 depicts an algorithm 600 that extends the expanded rewrite process of FIG. 4A to support multiple rules, in accordance with embodiments of the present invention. Algorithm 600 is a process for rewriting queries with respect to a list of multiple cleansing rules $C_1$ to $C_n$. Algorithm 600 assumes that all rules created by an application share the same ckey and skey. Because of dependencies among rules, rules are evaluated in the order of their creation time (e.g., from $C_1$ to $C_n$).

First, an expanded rewrite for a query Q given by $\sigma_s(R)$ is generated by the following process: For each rule $C_i$, compute a context condition $cc_i$ using lines 1 to 10 of algorithm 400 of FIG. 4A (see lines 1-2 of FIG. 6). If any $cc_i$ is empty (see line 3 of FIG. 6), there is no feasible expanded rewrite and the join-back approach is relied upon. Otherwise, an overall context condition cc is calculated as $cc_1 \| cc_2 \ldots \| cc_n$, which selects enough context data for all the rules. By following lines 11 to 13 in algorithm 400 of FIG. 4A, the expanded condition ec and the condition s' are determined accordingly. The expanded rewrite is then given by the expression $\sigma_{s'}(\Phi_{Cn} \ldots \Phi_{C1}(\sigma_{ec}(R)))$ (see line 4 of FIG. 6). Join queries can be handled in a manner similar to the description in Section 5.2. Extending the join-back rewrite to support multiple rules is straightforward because the elimination of non-relevant sequences is independent of the cleansing rules. Therefore, after all data in the relevant sequences are extracted, the cleansing rules $C_1$ to $C_n$ are applied in this order.

Both of the rewrites provide the correct answer to Q $[C_1 \ldots C_n]$, because all rules are applied in the right order. Regarding whether the evaluation order of those rules can be switched without changing the query semantics, it is noted that switching rule order may not be very crucial for achieving better performance. One can treat each rule $C_i$ as an expensive predicate on table R. Those predicates have the characteristics that their selectivities are all high because the number of anomalies is typically small and their costs are comparable because the sorting cost to produce the sequence order may be dominant. Since the optimal order for evaluating a set of expensive predicates mainly depends on their selectivity and relative cost, the performance difference between different orders is likely to be small.

6. Experiments

This section presents experimental results that validate the effectiveness of the deferred cleansing approach. The goal of the experiments is to test the deferred cleansing approach's scalability along three dimensions: (1) the amount of data to be queried, (2) the number of rules to be applied, and (3) the number of anomalies.

6.1 Experimental System Design

Figure 7:
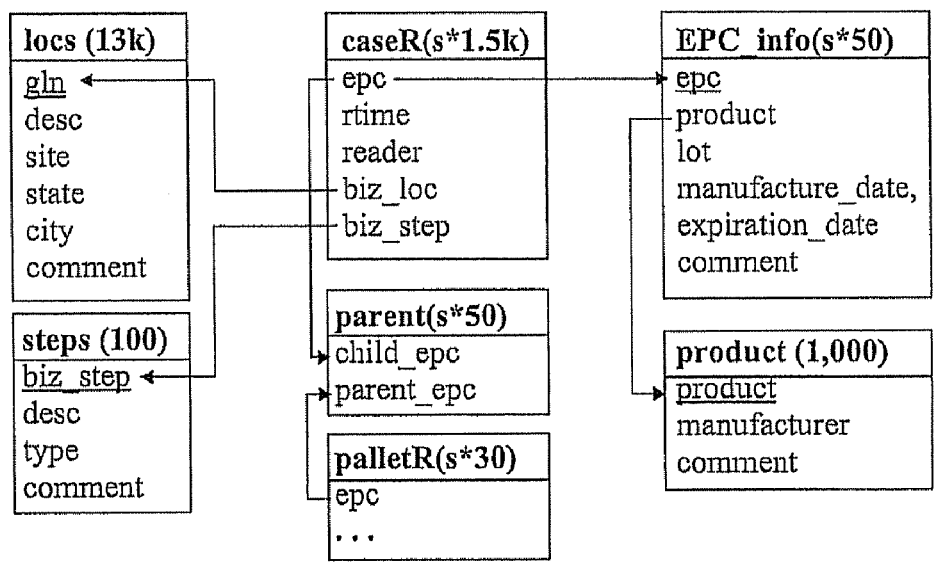
FIG. 7 depict the schema and relationships of seven relational tables that store simulated RFID data generated to test the effectiveness of the system and process of FIGS. 1 and 2, respectively, in accordance with embodiments of the present invention.

Because there is no existing benchmark for testing RFID applications, an RFID data generator (a.k.a. RFIDGen) was built in Java for these experiments. RFIDGen simulates a typical supply chain of a retailer W that keeps RFID data over the last five years together with related reference data. All information is stored in seven relational tables and their schema and relationships are summarized in FIG. 7. The primary key of each relational table in FIG. 7 is underlined and the arrows represent foreign key references. The number inside the parentheses indicates the number of rows in each table. The scale factor s is described later in this section.

Initially, the simulation generates normal (a.k.a. regular) RFID data (i.e., without anomalies). For this generation of normal RFID data, it is assumed that all goods sold by W have to go through three levels of distributions: a distribution center (DC), a warehouse, and a retail store. There are 1,000 retails stores, each of which receives goods from one of 25 warehouses, and each of the warehouses in turn receives shipments from one of 5 DCs. Every site (i.e., a DC, a warehouse, or a store) has 100 distinct locations, each equipped with an RFID reader. The "location" table stores all 13,000 distinct locations, each identified by a 13-character Global Location Number. Every shipment is read 10 times at randomly selected readers at each of the 3 sites that the shipment has to go through and generates a total of 30 RFID reads. The first read of an EPC is chosen randomly within a 5-year window and the latency between two consecutive reads of a shipment is randomly selected between 1 and 36 hours. Each shipment is uniquely identified by a 96-bit EPC represented by a 50-byte varchar. The shipments may be of two types: a case and a pallet. To factor in variance in goods size, a number between 20 and 80 is randomly chosen as the number of cases contained in a particular pallet. For simplicity, case reads and pallet reads are stored in two separate tables, "caseR" and "palletR", respectively, and the association between a case EPC and a pallet EPC are stored in a third "parent" table. It is assumed for this experiment that neither the case EPC nor the pallet EPC is reused and an association entry is always valid. Although not shown completely in FIG. 7, the schema of palletR is identical to caseR. A pallet and its associated cases always travel together and are read by the same reader within 10 minutes of each other. Each case EPC generates an entry in an "EPC_info" table, in which item specific information such as the lot number, the manufacture date and the expiration date are stored. Details about products are stored in a "product" table which is referenced by the EPC_info table. A total of 1,000 different products is generated and randomly assigned to 50 manufacturers. Each RFID read is also assigned a randomly selected business step from a total of 100 different steps stored in a "steps" table. All steps are evenly classified into 10 different types. The number of pallet EPCs "s" is defined as the scale factor. For a given s, there are approximately s*50 case EPCs. Therefore, palletR, caseR, parent, and EPC_info contain s*30, s*50*30 (i.e., s*1.5 k), s*50, and s*50 rows, respectively.

After the normal RFID data is generated, anomalies are then added over the regular data. Because pallets are read more reliably than cases, anomalies are introduced to case reads only. Five types of anomalies described in Section 4 are added by reversing the action of the cleansing rules. For example, if an action of a rule deletes a read from a sequence, a false read is added that meets the rule's condition. Given an anomaly percentage D, anomalies are distributed evenly among the five different types.

In FIG. 8, two representative benchmark queries and the SQL statements used in the experiment are depicted. The first query q1 in FIG. 8 performs a typical "dwell" analysis that calculates the average time shipments spent between two consecutive locations. The analysis of query q1 exploits SQL/OLAP functions to bring information of two adjacent reads of each EPC to the same row. The second query q2 in FIG. 8 resembles a typical analytical query (i.e., site analysis query). In q2, table caseR is treated as the fact table, which is joined with multiple dimensional tables to bring in the reference data. Specifically, the site analysis reports the reader utilization and business steps involved for each manufacturer at a particular distribution center. The choice of the two timestamps T1 and T2 are explained later in this section. The five cleansing rules defined in Section 4 are used in the experiments, with t1, t2 and t3 set to 5, 10 and 20 minutes respectively. Table 2 presented below summarizes the expanded conditions computed by the algorithm of FIG. 4A for both q1 and q2 with respect to each of the rules. Note that the cycle rule has two context references, one before and one after the target. Since neither cycle rule context is bounded by time, no expanded condition exists for q1 and q2. Further, the missing rule has an unbounded context reference following the target and only q1 does not have an expanded condition.

TABLE 2

| rule name | q1 | q2 |
|---|---|---|
| reader | rtime<=T1+5 min (c1) | rtime>=T2 (c4) |
| duplicate | rtime<=T1 (c2) | rtime>=T2+10min (c5) |
| replacing | rtime<=T1+20 min (c3) | rtime>=T2 |
| cycle | { } | { } |
| missing | { } | rtime>=T2 |

For the performance evaluation, DB2 V8.2 was used on a modern server-type machine running AIX. A scale factor s is chosen that generates approximately 10 million normal case reads (i.e., approximately 1 GB). Four different databases referred to as db-10, db-20, db-30 and db-40 are then loaded into DB2, and correspond to anomaly percentages 10, 20, 30 and 40, respectively. Data is loaded in an order partially correlated with time. For each database, all columns in both caseR and palletR (see FIG. 7) are indexed except for the reader column. The parent table (see FIG. 7) is indexed on child_epc to provide fast case-to-pallet lookups. The rest of the tables of FIG. 7 have indexes only on their primary keys, except that the locs table is further indexed on site and the steps table is further indexed on type. Each database uses a buffer pool of 160 MB. For each test, a comparison is performed among the elapsed times of running a benchmark query q on the dirty data directly (referred to hereinafter as q), the expanded rewrite (referred to hereinafter as q_e), the join-back rewrite (referred to hereinafter as q_j), and the naïve approach (referred to hereinafter as q n) that first cleans all data and then evaluates q. The naïve approach of performing deferred cleansing is to clean all the data on the fly before executing a query. Note that unlike the other three, q does not always provide the correct result, and is only used for a baseline comparison. The experiments do not explicitly compare eager cleansing with deferred cleansing. However, the cost of eager cleansing is comparable to that of q, since the anomaly percentage is typically small.

In the tests described in the following sections, q1 and q2 refer to a running of a benchmark query directly on dirty data; q1_e and q2_e refer to running the expanded rewrite; q1_j and q2_j refer to running the join-back rewrite; and q1_n and q2_n refer to running the naïve approach.

6.2 Varying Selectivity

In this section, the deferred cleansing approach is tested by scaling the data size requested by queries. In these tests, it is assumed that only the reader rule is enabled, and the database with 10% anomalies (i.e., db-10) is utilized. The selectivity of the predicate on rtime in both q1 and q2 is varied from 1% to 40%, by adjusting T1 and T2 accordingly.

Figure 9:
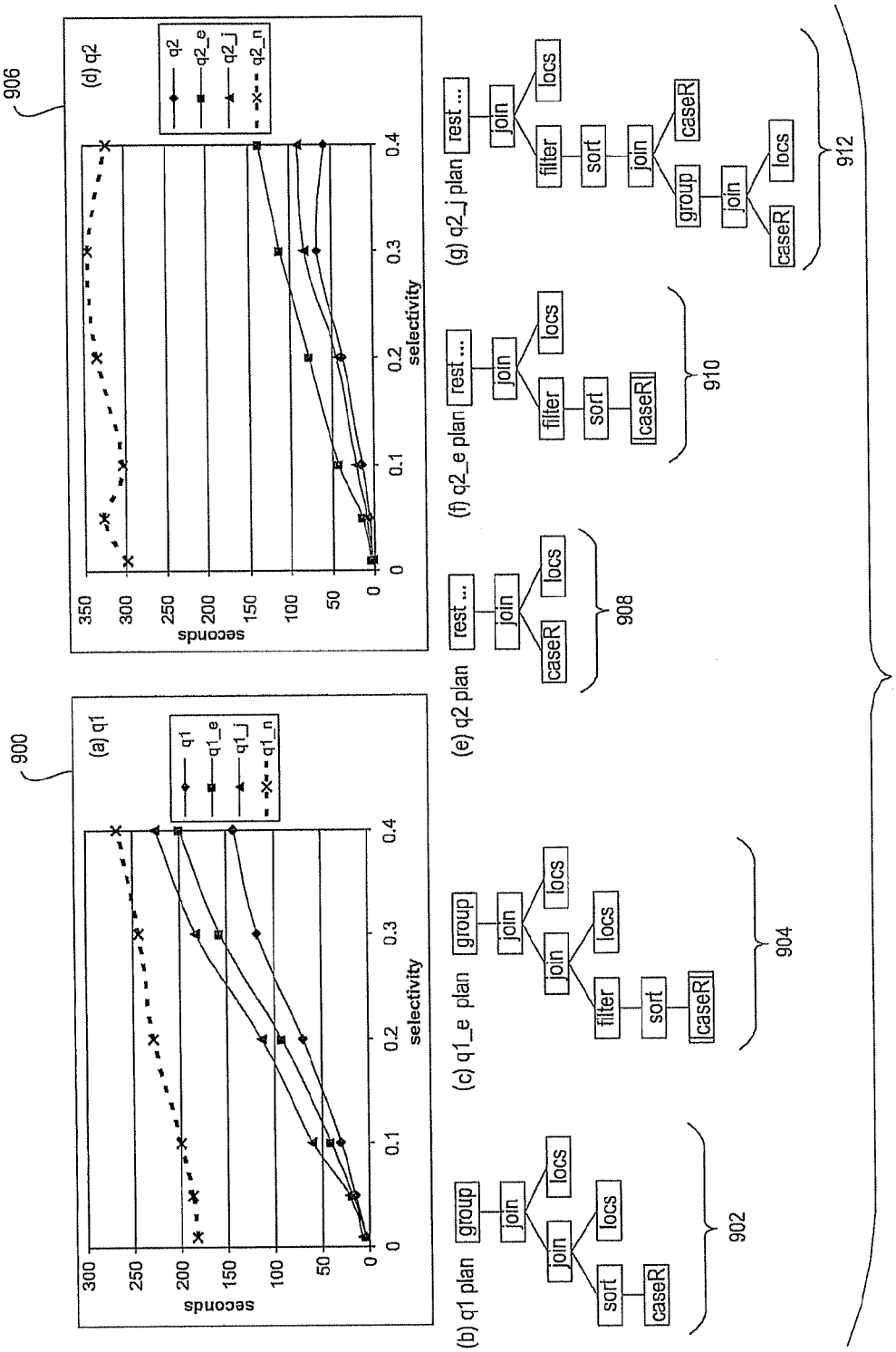
FIG. 9 depicts performance results of a test of deferred cleansing by varying selectivity, in accordance with embodiments of the present invention.

The performance results for q1 are shown in performance results 900 (i.e., section (a)) of FIG. 9. Both q1_e and q1_j perform significantly better than the naïve version q1_n across all selectivities and q1_e is more effective than q1_j.

An execution plan 902 for q1 is shown in section (b) of FIG. 9. Plan 902 first scans table caseR using the index on rtime. Plan 902 then evaluates the two scalar aggregates specified by SQL/OLAP by sorting input data in (epc,rtime) order. Afterwards, q1 joins table locs twice and does the final aggregation. In comparison, the plan for q1_e is shown as plan 904 in section (c) of FIG. 9. Since the predicate on rtime is expanded by five minutes, q1_e needs to bring in a little bit more data from caseR initially, which is shown as the caseR box with double side edges. Next, the q1_e plan evaluates the reader rule, by first sorting the input on (epc,rtime) and then removes anomalies through a filter. Once cleansing is completed, the q1_e plan continues with the rest of q1. It should be noted that because the ordering requirement for the SQL/OLAP evaluation in q1 is the same as that in the cleansing rule, data needs to be sorted only once. Although this seems incidental, such order sharing is expected to be common in RFID applications because it is often useful to process RFID data in sequence order. Therefore, compared with q1, q1_e incurs only the extra overhead of computing one more scalar aggregate, but does not have an extra sort, thereby explaining why q1_e adds only a small overhead on top of q1. In this example, since the only predicate restricting caseR is expandable, the expanded approach is always better than the join-back one which has to access table caseR twice. Finally, the naïve approach has to sort all data since it does not push down any predicate, and thus the performance of the naïve approach is significantly worse that the other approaches shown in section (a) of FIG. 9.

Performance results 906 for q2 are shown in section (d) of FIG. 9. Similar to q1, both q2_e and q2_j perform significantly better than the naïve approach (i.e., q2_n). In contrast to q1, q2_j is more effective than q2_e. This difference is explained by analyzing the plans. A partial plan 908 for the original query q2 is shown in section (e) of FIG. 9. Plan q2 first joins table caseR and locs since they are the only ones with local predicates. The box denoted by "rest ..." includes the rest of the joins, which do not reduce the cardinality further, as well as the final aggregation. The plan 910 for q2_e is shown in section (f) of FIG. 9. Note that q2_e does one more sort than q2 since the ordering requirement from cleansing in SQL/OLAP is different from that for grouping. Because only the rtime predicate is expandable, the cleansing process has to be done immediately after accessing table caseR before joining table locs. Thus, q2_e has to sort data including those to be rejected later by the join. The plan 912 for q2_j in section (g) of FIG. 9 exploits the constraint on both table caseR and locs by joining them first. The q2_j plan then computes a unique list of EPCs e through grouping, which essentially contains the set of shipments that q2 actually cares about. Afterwards, q2_j visits table caseR a second time to extract the full history of EPCs in e for cleansing. Note that the site column is partially correlated with EPC since at a particular site, a given EPC is read either multiple times (since it goes through that site) or none at all (since it does not go through the site). As a result, the predicate on site, in addition to the one on rtime, helps reduce the size of e significantly. This reduction in the size of e is a significant benefit to q2_j since q2_j has to sort fewer data and computes fewer scalar aggregates. Returning to the discussion of the q2_j plan, q2_j still needs to apply the predicate on rtime and site a second time to remove data no longer needed after cleansing. Such overhead is not significant as the relevant data set is small. The rest of q2_j is the same as q2. In summary, when the selectivity of the expandable predicate is small, q2_e is comparable to q2_j since the data reduction in the latter is offset by the join-back overhead. However, as the predicate on rtime becomes less restrictive, q2_j performs significantly better because it can effectively exploit the filtering power from the predicate on site.

Figure 10:
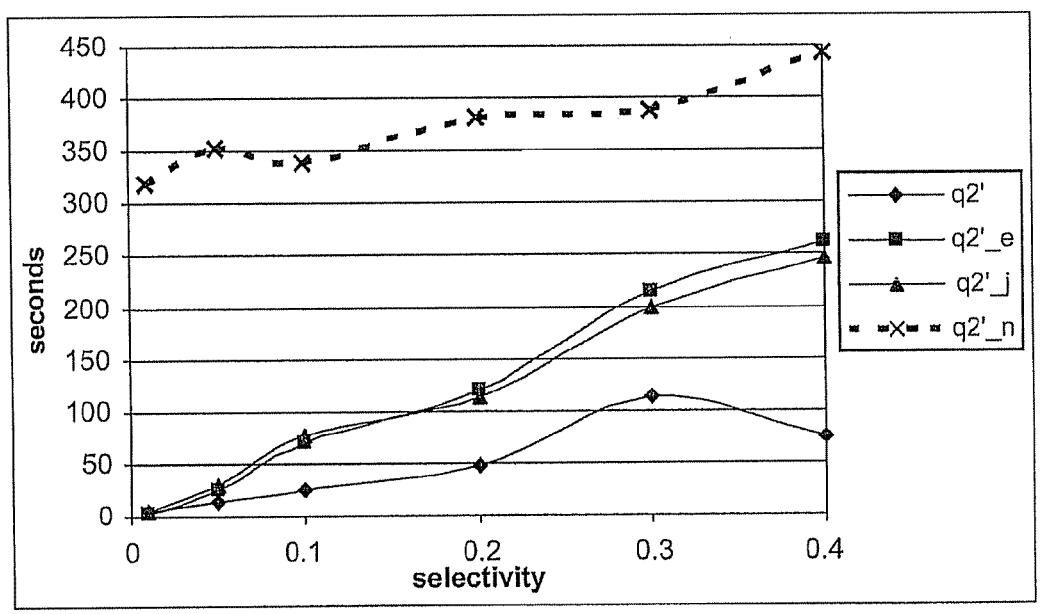
FIG. 10 depicts performance results of an extreme test of deferred cleansing by varying selectivity, in accordance with embodiments of the present invention.

As an extreme test, another query q2' is designed by swapping l.site and s.type in q2 and changing the constant from a DC to a specific business type. Data is deliberately populated such that s.type is completely uncorrelated with EPCs. The results for q2' are shown in performance results 1000 in FIG. 10. In this case, q2'_j is no longer significantly better than q2'_e. Although the predicate on s.type reduces the number of reads, it does not significantly reduce the set of EPCs (i.e., many EPCs having a single read) required for cleansing. Thus, the overhead of sorting and computing scalar aggregates in q2'_j is comparable with that in q2'_e. In actual cases, predicates on columns that partially correlate to EPCs are used more often in application queries because multiple reads for a shipment can be analyzed together. For example, it is more reasonable for q2' to select a set of business steps all common to some shipments.

6.3 Varying Rules and Dirty Percentage

Figure 11:
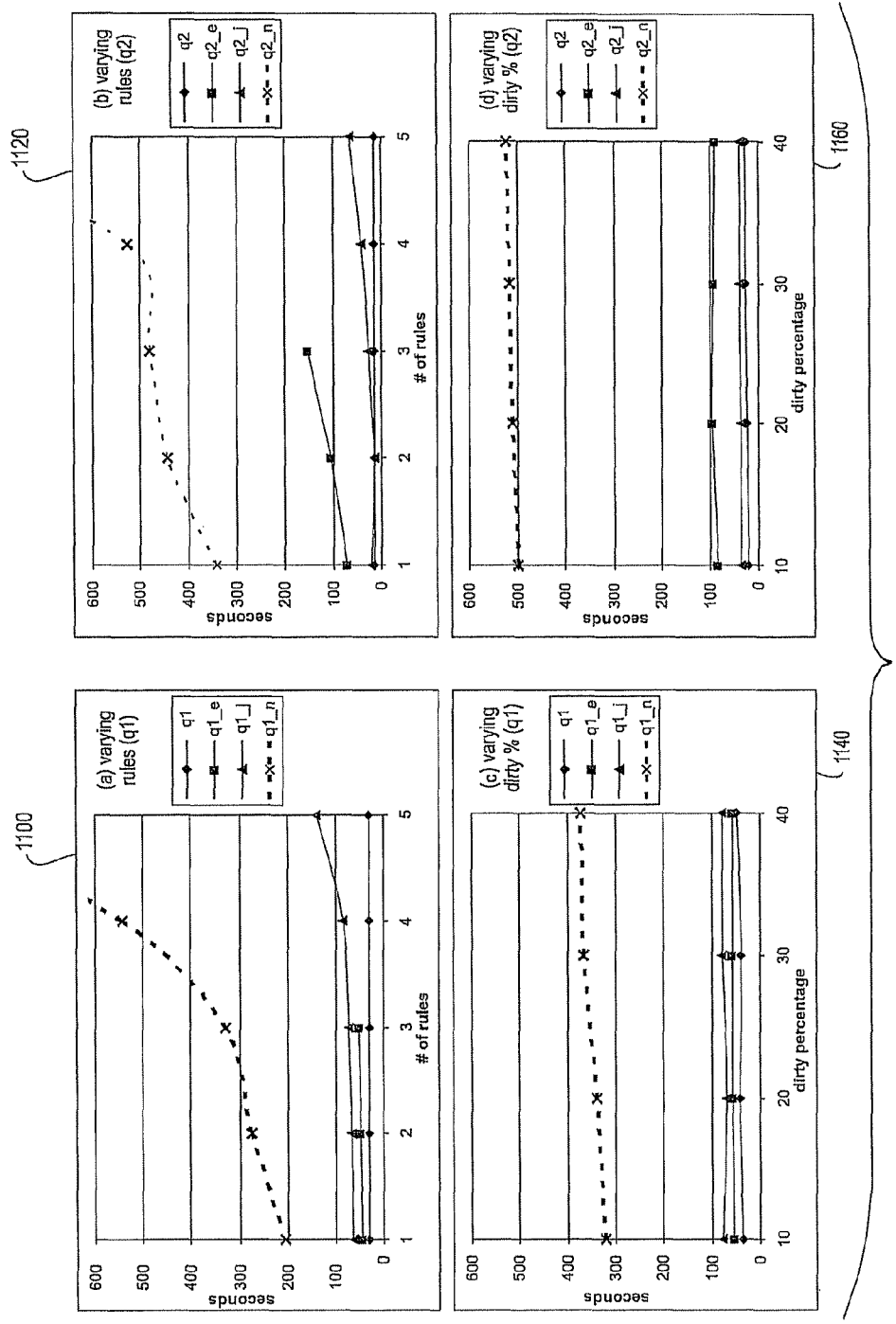
FIG. 11 depicts performance results of tests of scalability of deferred cleansing in terms of the number of rules and the number of anomalies, in accordance with embodiments of the present invention.

This section presents results of testing the scalability of deferred cleansing in terms of the number of rules. In both q1 and q2, the selectivity of the rtime predicate is fixed at 10% and the database with 10% anomalies is selected. The number of rules is then scaled from 1 to 5. The rules are added in the order listed in Table 2. For both q1 and q2, the expanded approach is only feasible up to the first three rules of Table 2. The join-back approach is valid for all rules of Table 2. These performance results are presented in graph 1100 and 1120 of FIG. 11. From 1 rule to 3 rules, the increase in the best rewrite strategy q1_e and q2_j is fairly small. Note that the ordering requirements for all rules are the same. Thus, only the first rule incurs the sorting overhead. Subsequent rules share the same sort and only pay the overhead of computing their own scalar aggregates. Starting from 4 rules, only the join-back approach becomes applicable. For both q1_j and q2_j, the cycle rule adds somewhat more overhead compared to previous rules because no expanded conditions can be applied on table caseR during join-back. The missing rule adds the most overhead among all the rules of Table 2. Unlike other rules, the missing rule takes input from the following derived table:

```
select epc, rtime, biz_loc, biz_step, reader, 0 as is_pallet
from caseR
union
select child_epc, rtime, biz_loc, biz_step, reader, 1 as is_pallet
from palletR, parent
where palletR.epc = parent.parent_epc
```

Conditions in q1 and q2 are applied on both caseR and palletR to obtain the set of EPCs to be cleaned and join-back is also performed on both tables. Since approximately every case read is now paired with a pallet read, the amount of data to be sorted is now doubled. The extra joins needed to retrieve pallet reads also add some overhead, but this is secondary because the reads are restricted to a smaller set of EPCs. Nevertheless, both q1_j and q2_j perform significantly better than the naïve approach, which takes about 1,000 seconds (not shown in FIG. 11) with 5 rules.

The last experiment tests deferred cleansing with respect to the number of anomalies. Again, the selectivity of the predicate on rtime is fixed at 10% in both q1 and q2. The first three rules listed in Table 2 are applied. The queries are then tested on four different databases, with anomalies from 10% to 40%. The results are shown in graphs 1140 and 1160 of FIG. 11. For both q1 and q2, the expanded query and the join-back query increase only slightly with more and more anomalies, and match the trend of the original query. Note that X % anomalies do not translate to an X % larger database because anomalies such as missing reads actually reduce the amount of raw data.

The experimental results of Section 6 show that deferred cleansing is affordable for typical analytic queries on RFID data. Both the expanded and the join-back approach perform significantly better than the naïve approach that applies rules without leveraging query information. When both the expanded and join-back approaches are applicable, there are tradeoffs between the two. It is also important to note that the overhead of cleansing is limited to the reads table. For analytic queries joining more reference data and computing more aggregates, the relative overhead of deferred cleansing is even smaller.

7. Computing System

Figure 12:
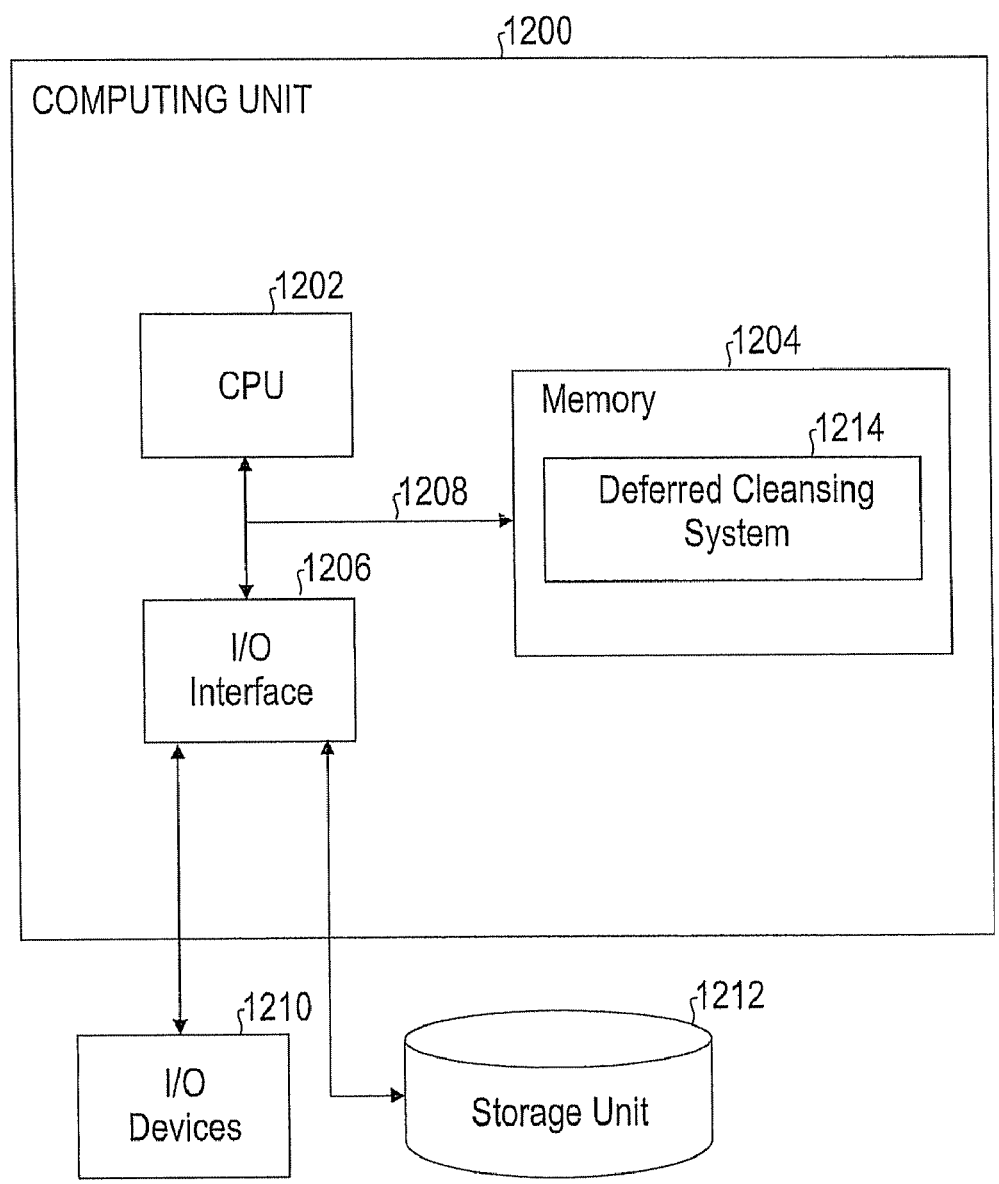
FIG. 12 is a computing system for implementing the processes of FIGS. 2, 4, 5 and 6, in accordance with embodiments of the present invention.

FIG. 12 is a computing system for implementing the processes of FIGS. 2, 4, 5 and 6, in accordance with embodiments of the present invention. Computing unit 1200 is suitable for storing and/or executing program code of a deferred cleansing system 1214, and generally comprises a central processing unit (CPU) 1202, a memory 1204, an input/output (I/O) interface 1206, a bus 1208, I/O devices 1210 and a storage unit 1212. CPU 1202 performs computation and control functions of computing unit 1200. CPU 1202 may comprise a single processing unit, or be distributed across one or more processing units in one or more locations (e.g., on a client and server).

Local memory elements of memory 1204 are employed during actual execution of the program code of deferred cleansing system 1214. Cache memory elements of memory 1204 provide temporary storage of at least some program code in order to reduce the number of times code must be retrieved from bulk storage during execution. Further, memory 1204 may include other systems not shown in FIG. 12, such as an operating system (e.g., Linux) that runs on CPU 1202 and provides control of various components within and/or connected to computing unit 1200. Memory 1204 may comprise any known type of data storage and/or transmission media, including bulk storage, magnetic media, optical media, random access memory (RAM), read-only memory (ROM), a data cache, a data object, etc. Storage unit 1212 is, for example, a magnetic disk drive or an optical disk drive that stores data (e.g., XML representations of work flows). Moreover, similar to CPU 1202, memory 1204 may reside at a single physical location, comprising one or more types of data storage, or be distributed across a plurality of physical systems in various forms. Further, memory 1204 can include data distributed across, for example, a LAN, WAN or storage area network (SAN) (not shown).

I/O interface 1206 comprises any system for exchanging information to or from an external source. I/O devices 1210 comprise any known type of external device, including a display monitor, keyboard, mouse, printer, speakers, handheld device, printer, facsimile, etc. Bus 1208 provides a communication link between each of the components in computing unit 1200, and may comprise any type of transmission link, including electrical, optical, wireless, etc.

I/O interface 1206 also allows computing unit 1200 to store and retrieve information (e.g., program instructions or data) from an auxiliary storage device (e.g., storage unit 1212). The auxiliary storage device may be a non-volatile storage device (e.g., a CD-ROM drive which receives a CD-ROM disk). Computing unit 1200 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of deferred cleansing system 1214 for use by or in connection with a computing unit 1200 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 1204, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of cleansing anomalies from sequence-based data at query time, comprising:
    loading sequence-based data into a database managed by a database management system (DBMS) of a computing system, said loading being performed at a load time of said sequence-based data that precedes a query time of said sequence-based data;
    receiving a cleansing rule at a cleansing rules engine of said computing system;
    automatically converting, by said cleansing rules engine, said cleansing rule to a template, said template including logic to compensate for one or more anomalies in said sequence-based data;
    receiving, at said query time and by a query rewrite engine of said computing system, a user query to retrieve said sequence-based data;
    automatically rewriting, at said query time and by said query rewrite engine, said user query to provide a rewritten query, wherein said automatically rewriting includes applying said logic included in said template to compensate for said one or more anomalies and wherein said automatically rewriting further includes performing at least one of: an expanded rewrite algorithm and a join-back algorithm to generate said rewritten query, said performing including:
        reducing said sequence-based data to a subset of said sequence-based data, said subset to be used by a generation of cleansed data; and
        executing, subsequent to said reducing, logic included in said user query on said cleansed data; and
    executing, at said query time, said rewritten query by said DBMS, wherein an answer provided by said executing said rewritten query is identical to a result of executing said user query on a set of data generated by an application of said cleansing rule to all of said sequence-based data, and wherein said reducing said sequence-based data to said subset and said executing said logic included in said user query provide an assurance that said answer provided by said executing said rewritten query is identical to said result of said executing said user query on said set of data generated by said application of said cleansing rule to all of said sequence-based data.

2. The method of claim 1, wherein said automatically converting said cleansing rule comprises:
    converting a singleton of two singletons to one or more scalar aggregates over a window of size one, wherein said two singletons are two rows of said sequence-based data referred to by a condition of said cleansing rule, wherein said window is defined according to relative sequence positions of said two singletons, and wherein said one or more scalar aggregates and said window are specified in SQL/OLAP.

3. The method of claim 1, wherein said automatically converting said cleansing rule comprises:
    defining a window in SQL/OLAP to include a set of rows of said sequence-based data, said set of rows referred to by a condition of said cleansing rule; and
    converting said condition to a case expression in SQL/OLAP over said window,
    wherein said condition refers to a singleton and said set of rows.

4. The method of claim 1, wherein said automatically converting said cleansing rule comprises one of:
    implementing an action of said cleansing rule as a filter condition in SQL/OLAP, if said action is a delete action or a keep action, wherein said delete action removes one or more rows of said sequence-based data and said keep action retains one or more rows of said sequence-based data; and
    converting said action of said cleansing rule to a case expression in SQL/OLAP if said action is a modify action, wherein said modify action modifies one or more rows of said sequence-based data.

5. The method of claim 4, wherein said automatically converting said cleansing rule comprises said implementing said action as said filter condition, wherein a rule condition of said cleansing rule is utilized directly as said filter condition if said action is said keep action, and wherein a negation of said rule condition is utilized as said filter condition if said action is said delete action.

6. The method of claim 1, wherein said automatically rewriting includes said performing said expanded rewrite algorithm, and wherein said performing said expanded rewrite algorithm further includes:
    for each context reference X of one or more context references included in a pattern of said cleansing rule (C) on a relational table R, performing a loop that includes:
        setting a correlation condition cr to a list of one or more conjuncts, said one or more conjuncts comprising at least one of: one or more explicit conjuncts included in a condition of said cleansing rule C and referring to said context reference X and one or more implied conjuncts, each implied conjunct being on a cluster key of said relational table R or a sequence key of said relational table R, wherein said correlation condition cr is a correlation condition between said context reference X and T, said T being a target reference included in said pattern,
        if said context reference X is a position-based context reference, then retaining in said one or more conjuncts of said correlation condition cr only position-preserving conjuncts,
        binding s to said target reference T, wherein said s is a query condition on said relational table R and is included in said user query (Q),
        running a transitivity analysis between said correlation condition cr and said query condition s,
        determining d, said d being a set including any conjunct of a condition generated through said transitivity analysis that refers only to said context reference X, and
        if set d is not empty, adding set d to a context condition cc, otherwise setting said context condition cc to an empty set and breaking out of said loop, wherein said context condition cc defines a context set for context reference X; and
    if said context condition cc is not said empty set, generating an expanded rewrite $Q_e$ as said rewritten query, otherwise setting said expanded rewrite $Q_e$ to a null value.

7. The method of claim 6, wherein said generating said expanded rewrite $Q_e$ comprises:

computing an expanded condition ec as s∥cc;
simplifying said query condition s to an optimized query condition s', said simplifying including setting said optimized query condition s' equal to s−cc; and
computing said expanded rewrite $Q_e$ by an expression $\sigma_{s'}(\Phi_c(\sigma_{ec}(R)))$, wherein said $\Phi_c(\sigma_{ec}(R))$ is a result of applying said cleansing rule C on a data set $\sigma_{ec}(R)$, wherein said data set $\sigma_{ec}(R)$ is a result of directly pushing said expanded condition ec to said relational table R and cleansing data of said relational table R selected by said expanded condition ec.

8. The method of claim 6, wherein said user query is of a form $\sigma_s R \leftrightarrow_{K_1} \sigma_{S_1} D_1 \leftrightarrow \ldots \leftrightarrow_{K_n} \sigma_{S_n} D_n$,
wherein said relational table R joins each table $D_i$ on column $K_i$ by n:1 joins,
wherein said any conjunct generated through said transitivity analysis is $P_i$ on tables $D'_i$, wherein i=1, ..., m and m<=n, and
wherein said performing said expanded rewrite algorithm further includes:
ordering said $D'_i$ in ascending selectivity order of $S'_i$ for i=1, ..., m;
performing a loop utilizing a counter incremented over a series of m+1 values, said performing said loop utilizing said counter including:
if said counter is equal to an initial value, generating a first SQL statement that defers all of said joins after a cleansing of said sequence-based data, said cleansing including utilizing said cleansing rule, otherwise generating an additional SQL statement that joins said relational table R with said tables $D'_1$ to $D'_i$ in an order specified by said ordering,
converting each join condition associated with said n:1 joins to a local conjunct on said relational table R of the form $R.K_i$ in (select $K_i$ from $D_i$ where $S_i$),
performing said expanded rewrite algorithm of claim 7,
generating a new SQL statement if all "in" conjuncts are derived on said context reference, said generating said new SQL statement including utilizing said performing said expanded rewrite algorithm of claim 7, and
converting said "in" conjuncts to joins if all of said "in" conjuncts are derived on said context reference;
compiling a set of up to m+1 SQL statements comprising said first SQL statement and said additional SQL statements generated by said loop utilizing said counter, said compiling including utilizing an optimizer of said DBMS;
determining, by said DBMS, estimates of costs of computing resources required for an execution of said SQL statements included in said set of up to m+1 SQL statements; and
selecting, as said rewritten query and subsequent to said determining, an optimal SQL statement from said set of up to m+1 SQL statements, said optimal SQL statement being associated with a least estimate of said determined estimates.

9. The method of claim 1, wherein said automatically rewriting includes said performing said join-back algorithm, and wherein said performing said join-back algorithm further includes:
ordering $D_1$ to $D_n$ in ascending selectivity order of Si, wherein said user query (Q) is of a form $\sigma_s R \leftrightarrow_{JC_1} \sigma_{S_1} D_1 \leftrightarrow \ldots \leftrightarrow_{JC_n} \sigma_{S_n} D_n$ in which said user query Q is said $\sigma_s R$ and a relational table R joins each table $D_i$ using condition JCi;
generating n+1 SQL queries said generating said n+1 SQL queries $Q_i$ including pushing from 0 to n semi-joins in an order specified by said ordering;
compiling said n+1 SQL queries Q[i], said compiling including utilizing an optimizer of said DBMS;
determining, by said DBMS, estimates of costs of computing resources required for an execution of each SQL query Q[i]; and
selecting, as said rewritten query and subsequent to said determining, an SQL query $Q_j$ of said n+1 SQL queries Q[i], said SQL query $Q_j$ being associated with a least estimate of said determined estimates.

10. The method of claim 9, wherein said generating said n+1 SQL queries Q[i] comprises:
setting a counter to an initial value; and
for said counter less than or equal to a terminal value, performing a loop that includes:
if said counter is equal to said initial value, setting T to a first projection $\Pi_{ckey}(\sigma_s R)$, otherwise setting T to a second projection $\Pi_{ckey}(\sigma_s R \leftrightarrow_{JC_1} \sigma_{Si} D_1 \leftrightarrow \ldots \leftrightarrow_{JC_i} \sigma_{Si} D_i)$, wherein said first projection and said second projection project input data of said first projection and said second projection, respectively, on ckey and remove duplicates therein, said ckey being a cluster key included in a definition of cleansing rule C, and wherein said setting T to said first projection and setting T to said second projection facilitate said pushing;
generating Q[i] as an expression $\sigma_{s'}(\Phi_c(\sigma_{ec}(R) \leftrightarrow_{ckey} T)))$, wherein ec is an expanded condition and s' is an optimized query condition, wherein said $\Phi_c(\sigma_{ec}(R) \leftrightarrow_{ckey}(T))$ is a result of applying said cleansing rule C on a data set $\sigma_{ec}(R)$, wherein said data set $\sigma_{ec}(R)$ is a result of directly pushing said expanded condition ec to said relational table R and cleansing data of said relational table R selected by said expanded condition ec, and wherein said generating includes:
computing said expanded condition ec as s∥cc, wherein said s is a query condition on said relational table R and is included in said user query Q, and wherein said cc is a context condition defining a context set for a context reference X, said context reference X included in one or more context references included in a pattern of said cleansing rule C, and
simplifying said query condition s to said optimized query condition s', said simplifying including setting said optimized query condition s' equal to s−cc; and
incrementing said counter.

11. The method of claim 1, wherein said automatically rewriting further includes:
performing said expanded rewrite algorithm to rewrite said user query as query $Q_e$;
performing said join-back algorithm to rewrite said user query as query $Q_j$; and
determining a first cost estimate associated with one or more computing resources required to execute said query $Q_e$;
determining a second cost estimate associated with said one or more computing resources required to execute said query $Q_j$;
selecting said query $Q_e$ as said rewritten query if said first cost estimate is less than said second cost estimate; and
selecting said query $Q_j$ as said rewritten query if said second cost estimate is less than said first cost estimate.

12. A computer program product, comprising a computer-usable medium having a computer-readable program code embodied therein, said computer-readable program code comprising an algorithm adapted to implement the method of claim 1.

13. A system for cleansing anomalies from sequence-based data at query time in a computing environment, comprising:
   means for loading sequence-based data into a database managed by a database management system (DBMS) of a computing system, said loading being performed at a load time of said sequence-based data that precedes a query time of said sequence-based data;
   means for receiving a cleansing rule at a cleansing rules engine of said computing system;
   means for automatically converting, by said cleansing rules engine, said cleansing rule to a template, said template including logic to compensate for one or more anomalies in said sequence-based data;
   means for receiving, at said query time and by a query rewrite engine of said computing system, a user query to retrieve said sequence-based data;
   means for automatically rewriting, at said query time and by said query rewrite engine, said user query to provide a rewritten query, wherein said means for automatically rewriting includes means for applying said logic included in said template to compensate for said one or more anomalies, and wherein said means for automatically rewriting further includes means for performing at least one of: an expanded rewrite algorithm and a join-back algorithm to generate said rewritten query, said means for performing including:
      means for reducing said sequence-based data to a subset of said sequence-based data, said subset to be used by a generation of cleansed data; and
      means for executing, subsequent to said reducing, logic included in said user query on said cleansed data; and
   means for executing, at said query time, said rewritten query by said DBMS, wherein an answer provided by said means for executing said rewritten query is identical to a result provided by a means for executing said user query on a set of data generated by an application of said cleansing rule to all of said sequence-based data, and wherein said means for reducing said sequence-based data to said subset and said means for executing said logic included in said user query provide an assurance that said answer provided by said executing said rewritten query is identical to said result of said executing said user query on said set of data generated by said application of said cleansing rule to all of said sequence-based data.

14. The system of claim 13, wherein said means for automatically rewriting includes said means for performing said expanded rewrite algorithm, and wherein said means for performing said expanded rewrite algorithm further includes:
   means for performing a loop for each context reference X of one or more context references included in a pattern of said cleansing rule (C) on a relational table R, said means for performing said loop including:
      means for setting a correlation condition cr to a list of one or more conjuncts, said one or more conjuncts comprising at least one of: one or more explicit conjuncts included in a condition of said cleansing rule C and referring to said context reference X and one or more implied conjuncts, each implied conjunct being on a cluster key of said relational table R or a sequence key of said relational table R, wherein said correlation condition cr is a correlation condition between said context reference X and T, said T being a target reference included in said pattern,
      means for retaining in said one or more conjuncts of said correlation condition cr only position-preserving conjuncts, if said context reference X is a position-based context reference,
      means for binding s to said target reference T, wherein said s is a query condition on said relational table R and is included in said user query (Q),
      means for running a transitivity analysis between said correlation condition cr and said query condition s,
      means for determining d, said d being a set including any conjunct of a condition generated through said transitivity analysis that refers only to said context reference X, and
      means for adding set d to a context condition cc if set d is not empty, and otherwise for setting said context condition cc to an empty set and breaking out of said loop, wherein said context condition cc defines a context set for context reference X; and
   means for generating, if said context condition cc is not said empty set, an expanded rewrite $Q_e$ as said rewritten query, and otherwise for setting said expanded rewrite $Q_e$ to a null value.

15. The system of claim 14, wherein said means for generating said expanded rewrite $Q_e$ comprises:
   means for computing an expanded condition ec as s∥cc;
   means for simplifying said query condition s to an optimized query condition s', said means for simplifying including means for setting said optimized query condition s' equal to s−cc; and
   means for computing said expanded rewrite $Q_e$ by an expression $\sigma_{s'}(\Phi_c(\sigma_{ec}(R)))$, wherein said $\Phi_c(\sigma_{ec}(R))$ is a result of applying said cleansing rule C on a data set $\sigma_{ec}(R)$, wherein said data set $\sigma_{ec}(R)$ is a result of directly pushing said expanded condition ec to said relational table R and cleansing data of said relational table R selected by said expanded condition ec.

16. The system of claim 14, wherein said user query is of a form $\sigma_s R \leftrightarrow_{K1} \sigma_{S1} D_1 \leftrightarrow \ldots \leftrightarrow_{Kn} \sigma_{Sn} D_n$,
   wherein said relational table R joins each table $D_i$ on column $K_i$ by n:1 joins,
   wherein said any conjunct generated through said transitivity analysis is $P_i$ on tables $D'_i$, wherein i=1, ..., m and m<=n, and
   wherein said means for performing said expanded rewrite algorithm further includes:
      means for ordering said $D'_i$ in ascending selectivity order of $S'_i$ for i=1, ..., m;
      means for performing a loop utilizing a counter incremented over a series of m+1 values, said means for performing said loop utilizing said counter including:
         if said counter is equal to an initial value, means for generating a first SQL statement that defers all of said joins after a cleansing of said sequence-based data, said cleansing including utilizing said cleansing rule, otherwise means for generating an additional SQL statement that joins said relational table R with said tables $D'_1$ to $D'_i$ in an order specified by said ordering,
         means for converting each join condition associated with said n:1 joins to a local conjunct on said relational table R of the form R.$K_i$ in (select $K_i$ from $D_i$ where $S_i$),
         means for performing steps of said expanded rewrite algorithm of claim 7, means for generating a new SQL statement if all "in" conjuncts are derived on said context reference, said means for generating said new SQL statement including means for utilizing said performing said steps of said expanded rewrite algorithm of claim 7; and means for converting said "in" conjuncts to joins if all of said "in" conjuncts are derived on said context reference;

means for compiling a set of up to m+1 SQL statements comprising said first SQL statement and said additional SQL statements generated by said loop utilizing said counter, said means for compiling including means for utilizing an optimizer of said DBMS;

means for determining, by said DBMS, estimates of costs of computing resources required for an execution of said SQL statements included in said set of up to m+1 SQL statements; and means for selecting, as said rewritten query and subsequent to said determining, an optimal SQL statement from said set of up to m+1 SQL statements, said optimal SQL statement being associated with a least estimate of said determined estimates.

17. The system of claim 13, wherein said means for automatically rewriting includes said means for performing said join-back algorithm, and wherein said means for performing said join-back algorithm further includes:

means for ordering $D_1$ to $D_n$ in ascending selectivity order of Si, wherein said user query (Q) is of a form $\sigma_s R \leftrightarrow_{JC1} \sigma_{S1} D_1 \leftrightarrow \ldots \leftrightarrow_{JCn} \sigma_{Sn} D_n$ in which said user query Q is said $\sigma_s R$, and a relational table R joins each table $D_i$ using condition JCi;

means for generating n+1 SQL queries said means for generating said n+1 SQL queries $Q_i$ including means for pushing from 0 to n semi-joins in an order specified by said ordering;

means for compiling said n+1 SQL queries Q[i], said means for compiling including means for utilizing an optimizer of said DBMS;

means for determining, by said DBMS, estimates of costs of computing resources required for an execution of each SQL query Q[i]; and means for selecting, as said rewritten query and subsequent to said determining, an SQL query $Q_j$ of said n+1 SQL queries Q[i], said SQL query $Q_j$ being associated with a least estimate of said determined estimates.

18. The system of claim 17, wherein said means for generating said n+1 SQL queries Q[i] comprises:

means for setting a counter to an initial value; and means for performing a loop for said counter less than or equal to a terminal value, said means for performing said loop including:

means for setting T to a first projection $\Pi_{ckey}(\sigma_s R)$ if said counter is equal to said initial value, otherwise for setting T to a second projection $\Pi_{ckey}(\sigma_s R \leftrightarrow_{JCi} \sigma_{Si} D_1 \leftrightarrow \ldots \leftrightarrow_{JCi} \sigma_{Si} D_i)$, wherein said first projection and said second projection project input data of said first projection and said second projection, respectively, on ckey and remove duplicates therein, said ckey being a cluster key included in a definition of cleansing rule C, and wherein said setting T to said first projection and setting T to said second projection facilitate said pushing;

means for generating Q[i] as an expression $\sigma_{s'}((\Phi_c(\sigma_{ec}(R) \leftrightarrow_{ckey}(T)))$, wherein ec is an expanded condition and s' is an optimized query condition, wherein said $\Phi_c(\sigma_{ec}(R) \leftrightarrow_{ckey}(T))$ is a result of applying said cleansing rule C on a data set $\sigma_{ec}(R)$, wherein said data set $\sigma_{ec}(R)$ is a result of directly pushing said expanded condition ec to said relational table R and cleansing data of said relational table R selected by said expanded condition ec, and wherein said means for generating includes:

means for computing said expanded condition ec as s||cc, wherein said s is a query condition on said relational table R and is included in said user query Q, and wherein said cc is a context condition defining a context set for a context reference X, said context reference X included in one or more context references included in a pattern of said cleansing rule C, and means for simplifying said query condition s to said optimized query condition s', said means for simplifying including means for setting said optimized query condition s' equal to s−cc; and means for incrementing said counter.

* * * * *